(12) United States Patent
Hino et al.

(10) Patent No.: US 8,031,359 B2
(45) Date of Patent: Oct. 4, 2011

(54) INFORMATION PROCESSING APPARATUS, CONTROL METHOD THEREFOR, AND PROGRAM

(75) Inventors: Yasuhiro Hino, Yokohama (JP); Hiroyuki Amano, Yokohama (JP); Toru Ushiku, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/822,775

(22) Filed: Jun. 24, 2010

(65) Prior Publication Data

US 2010/0253979 A1 Oct. 7, 2010

Related U.S. Application Data

(63) Continuation of application No. 11/404,255, filed on Apr. 13, 2006, now Pat. No. 7,768,667.

(30) Foreign Application Priority Data

Apr. 15, 2005 (JP) ................................ 2005-118978

(51) Int. Cl.
*G06F 15/00* (2006.01)
*G06F 15/173* (2006.01)

(52) U.S. Cl. ...................................... 358/1.15; 709/224
(58) Field of Classification Search ................. 358/1.15, 358/1.13, 1.14, 1.16, 1.18, 538, 403, 1.1, 358/500, 1.6; 709/200, 204, 217, 240, 246, 709/201, 228, 225; 707/1, 3, 7, 104, 200, 707/204; 379/112.06, 112.07; 715/236, 715/249, 274, 273
See application file for complete search history.

(56) References Cited

U.S. PATENT DOCUMENTS 6,224,048 B1 * 5/2001 Motamed .................... 270/52.02
7,768,667 B2 * 8/2010 Hino et al. ................... 358/1.15

* cited by examiner

*Primary Examiner* — Saeid Ebrahimi Dehkordy
(74) *Attorney, Agent, or Firm* — Cowan, Liebowitz & Latman, P.C.

(57) ABSTRACT

Job management information is analyzed to extract post printing process information on a post printing process from the job management information on the basis of the analysis result. A stylesheet corresponding to the extracted post printing process information is selected from a stylesheet storing unit which stores a stylesheet functioning as layout data for laying out and outputting post printing process information in accordance with the output form of an output destination. Work order form data of the corresponding post printing process is generated on the basis of the selected stylesheet and post printing process information.

6 Claims, 42 Drawing Sheets

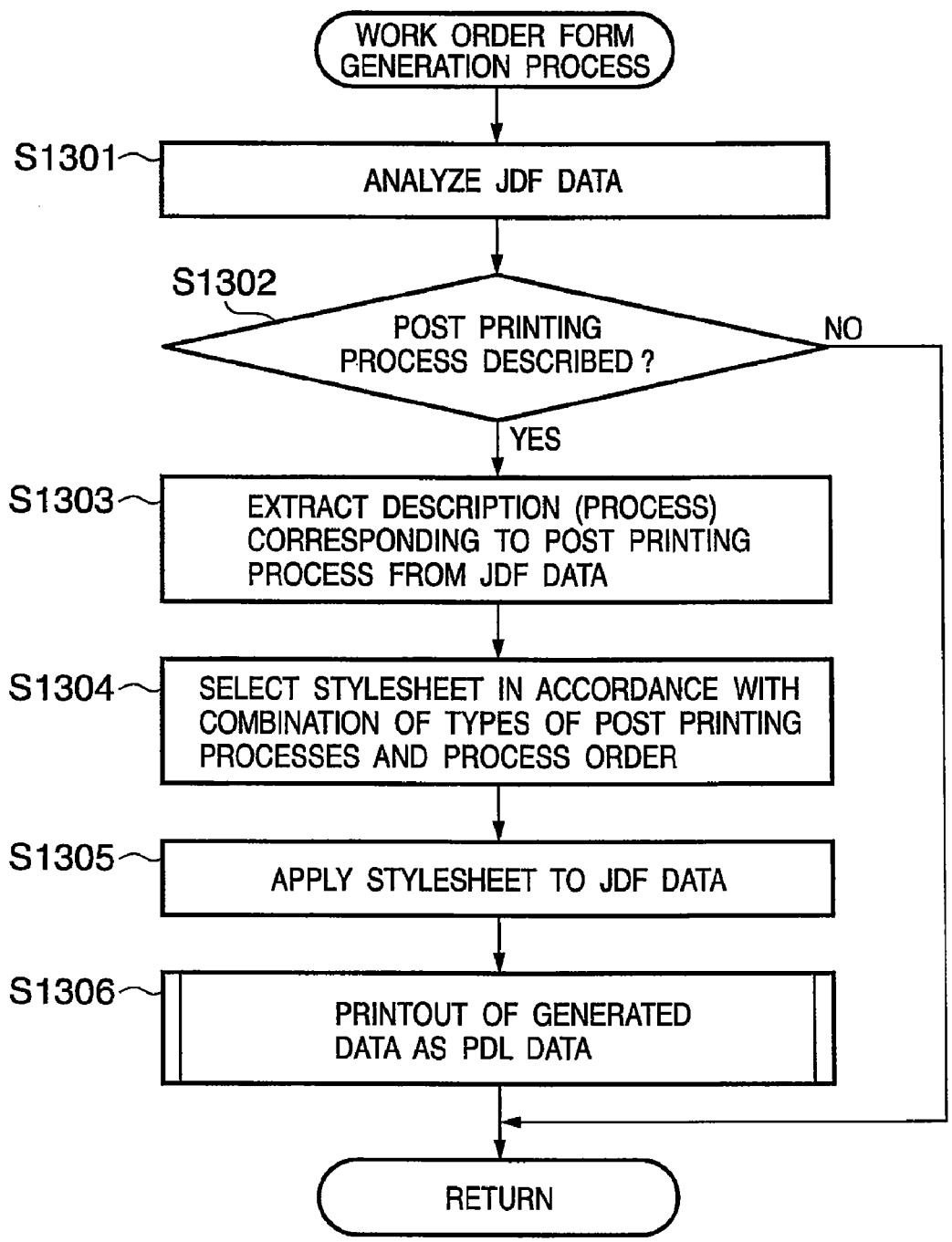

FIG. 10

```
<JDF xmlns="http://www/CIP4.org/JDFSchema_1_1"
    ID="J1" Status="Waiting" Type="Combined"                          } 1010
    Type="DisitalPrinting folding Stitching cutting "Version="1.2">
    <ResourceLinkPool>
        <!--folding parameters-->
        <FoldingParamsLink CombinedProcessIndex="1" Usage="Input" rRef="L3"/>  } 1011
        <!--Stitching parameters-->
        <StitchingParamsLink CombinedProcessIndex="2" Usage="Input" rRef="L4"/> } 1012
        <!--Cutting parameters-->
        <CuttingParamsLink CombinedProcessIndex="3" Usage="Input" rRef="L4"/>  } 1013
    </ResourceLinkPool>
</JDF>
```

FIG. 11

```
<?xml version="1.0" encoding="Shift_jis?>
<xsl:stylesheet version="1.0" xmlns:xsl="http://www.w3.org/1999/XSL/Transform">
<xsl:template match="/">
   <html>
      <body>
         <xsl:apply-templates/>
      </body>
   </html>
</xsl:template>
<xsl:template match="title">
   <h3>OFFLINE WORK ORDER FORM</h3>
</xsl:template>
<xsl:template match="tbl">
   <table border="3">
      <tr><th>WORK ORDER</th><th>PARAMETER</th></tr>
      <xsl:variable name="..."select="document(@href)"/>
      <xsl:for-each select="$t//CombinedProcessIndex">
         :
         <tr>
            <td><xsl:value-of select="..."/></td>
            <td><xsl:value-of select="..."/></td>
         </tr>
         :
      </xsl:for-each>
   </table>
</xsl:template>
</xsl:stylesheet>
```

F I G. 12
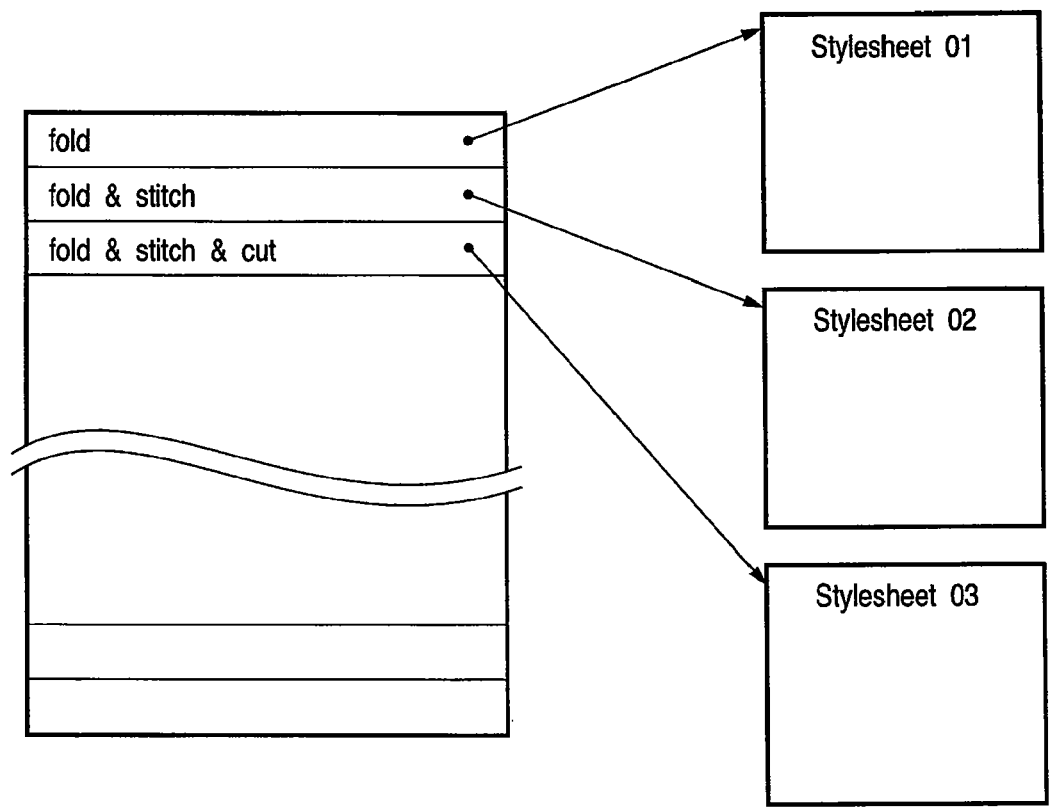

FIG. 13

OFFLINE WORK ORDER FORM

| ORDER ID |
|---|
| J1 000001 |

| LINE NUMBER |
|---|
| 01 |

| WORK ORDER | PARAMETER |
|---|---|
| stitch | saddle 2 |
| fold | center / inside |
| cut | A / B / C |

|  | FOLDING MACHINE | CUTTING MACHINE | SADDLE STITCHING MACHINE | NUMBER OF OPERATORS |
|---|---|---|---|---|
| OPERATOR | A | C | B | 3 |

FIG. 30

OFFLINE WORK ORDER FORM 《fold》

ORDER ID: J1 000001

LINE NUMBER: 01

| WORK ORDER | PARAMETER |
|---|---|
| fold | center / inside |
| stitch | saddle 2 |
| cut | A / B / C / |

<WORK ORDER FORM FOR OPERATOR A>

OFFLINE WORK ORDER FORM 《stitch》

ORDER ID: J1 000001

LINE NUMBER: 01

| WORK ORDER | PARAMETER |
|---|---|
| fold | center / inside |
| stitch | saddle 2 |
| cut | A / B / C / |

<WORK ORDER FORM FOR OPERATOR B>

OFFLINE WORK ORDER FORM 《cut》

ORDER ID: J1 000001

LINE NUMBER: 01

| WORK ORDER | PARAMETER |
|---|---|
| fold | center / inside |
| stitch | saddle 2 |
| cut | A / B / C / |

<WORK ORDER FORM FOR OPERATOR C>

FIG. 32

| SKILL / OPERATOR | FOLDING MACHINE | SADDLE STITCHING MACHINE | CUTTING MACHINE |
|---|---|---|---|
| A | High | High | High |
| B | High | High | High |
| C | Low | Low | Low |

FIG. 34

OFFLINE WORK ORDER FORM
《fold》

| ORDER ID |
|---|
| J1 000001 |

| LINE NUMBER |
|---|
| 01 |

| WORK ORDER | PARAMETER |
|---|---|
| fold | center / inside |
| stitch | saddle 2 |
| cut | A / B / C / |

<WORK ORDER FORM FOR OPERATOR A>

OFFLINE WORK ORDER FORM
《stitch》

| ORDER ID |
|---|
| J1 000001 |

| LINE NUMBER |
|---|
| 01 |

| WORK ORDER | PARAMETER |
|---|---|
| fold | center / inside |
| stitch | saddle 2 |
| cut | A / B / C / |

<WORK ORDER FORM FOR OPERATOR B>

OFFLINE WORK ORDER FORM
《cut》

| ORDER ID |
|---|
| J1 000001 |

| LINE NUMBER |
|---|
| 01 |

| WORK ORDER | PARAMETER |
|---|---|
| fold | center / inside |
| stitch | saddle 2 |
| cut | A / B / C / |

<Cut process details :
machine name : ****>
1. Please set up cutting machine.
   ->I.···.
   ->II.···.
2.···.    — 3401

<WORK ORDER FORM FOR OPERATOR C>

FIG. 37
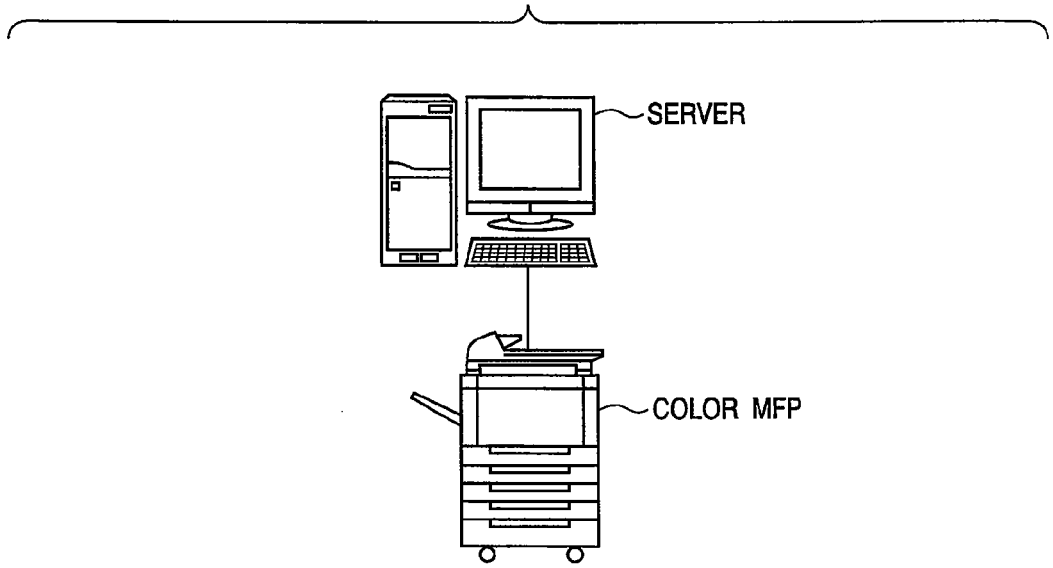
TYPE OF POST PRINTING PROCESS
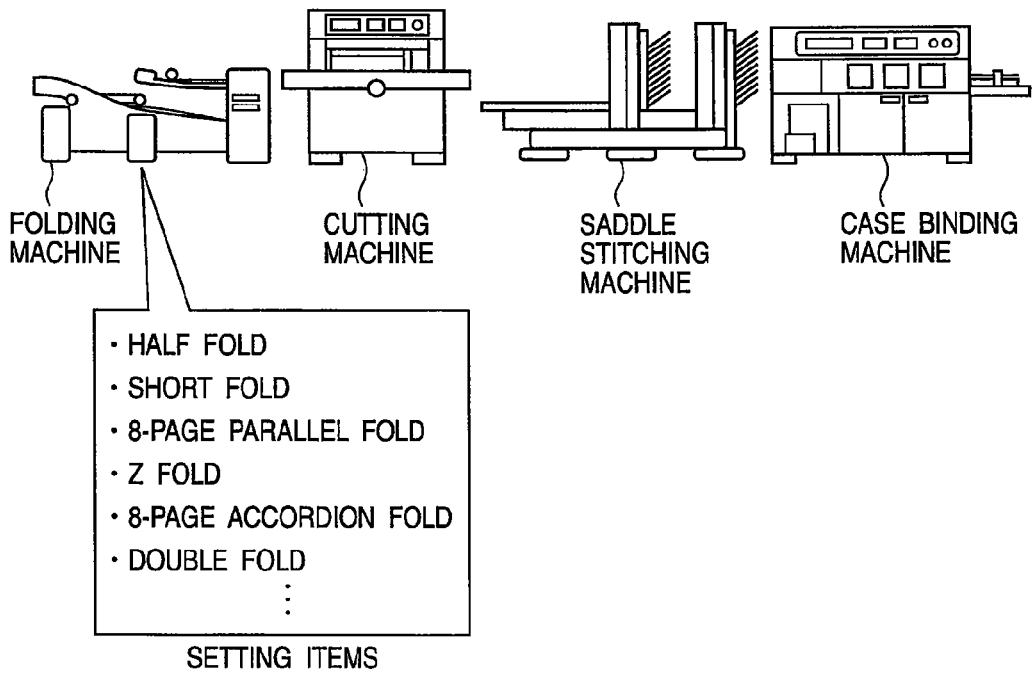
FOLDING MACHINE     CUTTING MACHINE     SADDLE STITCHING MACHINE     CASE BINDING MACHINE
- HALF FOLD
- SHORT FOLD
- 8-PAGE PARALLEL FOLD
- Z FOLD
- 8-PAGE ACCORDION FOLD
- DOUBLE FOLD
  ⋮
SETTING ITEMS FIG. 38
| | |
|---|---|
| 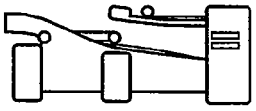 FOLDING MACHINE | |
| SETTINGS | FINISHER |
| HALF FOLD | (1) FINISHER A, (2) FINISHER B, (3) FINISHER C |
| SHORT FOLD | (1) FINISHER A, (2) FINISHER C |
| 8-PAGE PARALLEL FOLD | (1) FINISHER C, (2) FINISHER A |
| ⋮ | |
| 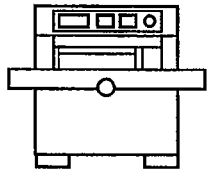 CUTTING MACHINE | |
| ⋮ | |

FIG. 39
FINISHER A (HALF FOLD)
MODEL
  FINISHER A
POSITION
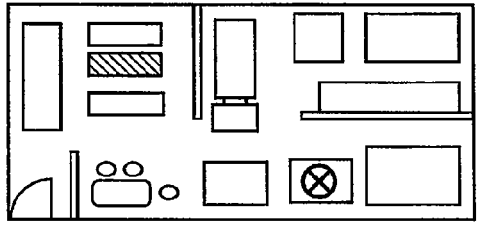
1F-
PROCESS
PROCEDURES
XXXXXXXXXXXXXXXXXXXXXXXXXXX
XX
　・XXXXXXXXXXXXXX
　・XXXXXXXXXXXXXXXXXXXXXXX
XX
FINISHER A (SHORT FOLD)
MODEL
  FINISHER A
POSITION
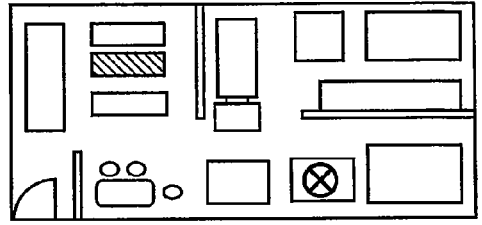
1F-
PROCESS
PROCEDURES
XXXXXXXXXXXXXXXXXXXX
　・XXXXXXXXXXXX
　・XXXXXXXXXXXXXX
　・XXXXX
FINISHER C (8-PAGE PARALLEL FOLD)
MODEL
  FINISHER C
POSITION
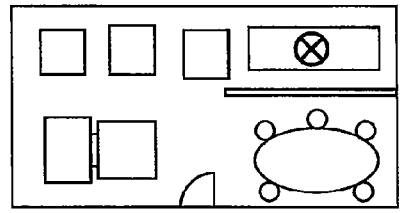
2F-S
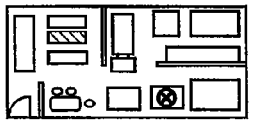
1F-
PROCESS

F I G. 42

| COMBINATION OF POST PRINTING PROCESSES | PREPARED STYLESHEET |
|---|---|
| CUTTING MACHINE → SADDLE STITCHING MACHINE | STYLESHEET AA: (FINISHER A, FINISHER E) STYLESHEET CC: (FINISHER A, FINISHER G) |
| CUTTING MACHINE → CASE BINDING MACHINE | STYLESHEET BB: (FINISHER A, FINISHER F) STYLESHEET DD: (FINISHER A, FINISHER H) |
| CUTTING MACHINE → FOLDING MACHINE | STYLESHEET EE: (FINISHER A, FINISHER I) STYLESHEET FF: (FINISHER A, FINISHER J) STYLESHEET GG: |
| ⋮ | ⋮ |

INFORMATION PROCESSING APPARATUS, CONTROL METHOD THEREFOR, AND PROGRAM

CROSS-REFERENCE TO RELATED APPLICATION

This application is a continuation of application Ser. No. 11/404,255, filed Apr. 13, 2006 now U.S. Pat. No. 7,768,667, the entire disclosure of which is hereby incorporated by reference.

FIELD OF THE INVENTION

The present invention relates to an information processing apparatus which generates, on the basis of job management information of a printing job for a printing system that implements various processes by a printing apparatus and post processing apparatus, work order form data for a post printing process to be executed by the post processing apparatus, a control method therefor, and a program.

BACKGROUND OF THE INVENTION

There has conventionally been a commercial printing industry in which printing is done by contract. In the commercial printing industry, a third party (customer or client) places an order to create a printed product (e.g., magazine, newspaper, brochure, advertisement, or gravure), and a desired printed product is created. The created printed product is delivered to the ordering client to get the fee of the printed product from the client. Even now, the commercial printing industry does business mainly using large-scale printing apparatuses such as an offset reproduction printing press.

In the commercial printing industry, work proceeds through various processes such as entry, design & layout, comprehensive layout (presentation using a printer output), proofreading (layout correction and color correction), proof (proof print), block copy preparation, printing, post process, and shipping. The reason of going through these processes is that a block copy must be prepared in this printing environment and once the block copy is prepared, it is difficult and disadvantageous in cost to correct the block copy. Thus, careful proofreading (layout check and color confirmation) is indispensable.

As described above, in this industry, large-scale apparatuses are needed, and a long time is taken to create a printed product desired by a client. Work operations require expert knowledge and know-how of experts.

Nowadays, with the advent of high-speed and high-image quality electrophotographic and inkjet printing apparatuses, a business category of print-on-demand (POD) is present against the conventional printing industry. The POD intends to print many copies and many jobs in a short delivery period without using the above-mentioned large-scale printing apparatus or system. The POD allows the advent of a new market where digital printing using electronic data is implemented to do business by making the best of digital image forming apparatuses such as a digital copying machine and digital multi-function peripheral.

In this POD market, printing is merged with digitization more than in the conventional commercial printing industry, and management and control using computers become widespread. By utilizing this feature, POD printing is coming close to a given printing industry level. In this background, the POD market provides PFP (Print For Pay) which is a printing service for a copy/print shop, and CRD (Centralized Reproduction Department) which is an in-house printing service.

In today's POD market, several standards have been developed by industrial groups to aim at implementation of comprehensive business supports and efficient business operation. An example of these standards is a format CIP3 (International Cooperation For Integration of Prepress, Press and Postpress). Another example is JDF (Job Definition Format) in CIP4 (International Cooperation For Integration of Processes in Prepress, Press and Postpress).

A PPF is a format for integrating all printing workflows, i.e., prepress, press, and postpress, and exchanging data on processes and management between processes. The PPF is based on PostScript®. The PPF is exploited as a standard format which aims to stabilize the quality, reduce errors, increase the process speed, and efficiently operate the production equipment by treating various kinds of information such as management information, ink adjustment, and designation of the cutting position.

A JDF is a format containing additional information such as the controllability of the PPF, prepress work information called PJTF (Portable Job Ticket Format) proposed by Adobe, and control attributes. A feature of the JDF is integration of pieces of information in prepress, press, and postpress, cooperation with the production and process control manager, and compatibility with existing systems.

The JDF follows an architecture of exchanging an electronic work order form called Job Ticket, which is suitable for the PJTF. This architecture can sequentially execute necessary processes in respective processes on the basis of the log, work order, management information, and the like, and transfer information on each process to the next process.

The JDF adopts XML (eXtensible Markup Language) as a language which constructs Job Ticket (work order form information to programs and devices). The JDF defines a template called a schemer which describes XML elements and an attribute array. In accordance with the defined schemer, XML data is rewritten in each process.

By using this format, it is becoming easy to comprehensively manage processes from entry from a client to delivery, and manage various kinds of information on a printout.

In order to increase the business efficiency of the operator in the POD market, there has conventionally been proposed a technique of supporting and designating the contents of post process work performed by the operator.

For example, patent reference 1 discloses a technique which allows the operator, who operates a collator used in a post process to collate different output products into one printed product, to efficiently do work. More specifically, this reference discloses a configuration in which paper sheets each bearing a barcode representing page information and job information for forming one printed product are printed together with different output products.

By using this technique, the operator suffices to set different printed products at respective bins of the collator together with barcode-printed paper sheets, and designate the start of processing. At the same time as the start of processing, the designated collator loads the barcode, recognizes the collation order of sheets and a finishing process after collation, and generates one printed product.

Patent reference 2 discloses a mechanism which designates collation by printing, on a cover sheet, coded information recognizable by a finish device (collator) when a plurality of different output products are collated into one printed product, similar to patent reference 1. In paragraph [0016] of patent reference 2, it is disclosed to print information readable by the user (operator) on a cover sheet.

Patent reference 3 discloses a configuration to create an order form recognizable by the operator and finisher.

In the following description, a post step of executing a post process uses devices called finishers such as a folding machine and cutting machine. These devices can be classified into three types.

The first type is a finisher which is directly connected to a printing apparatus and automatically receives paper. This finisher is called an "inline finisher".

The second type is a finisher which is connected to a network, but is not directly physically coupled to a printing apparatus, does not automatically receive paper, and requires the intervention of manual work of the operator. This finisher is called a "near-line finisher".

The third type is a finisher which is neither connected to any network nor has any transmission means for information (e.g., a job ticket). This finisher is called an "offline finisher".

Of these three types of finishers, the present invention is directed to the near-line finisher and offline finisher which require the intervention of manual work of the operator. The offline finisher whose problem is clearer will be explained.

When the offline finisher is used, the operator must sequentially bring printed products (paper sheets) output from the printing apparatus to respective devices, and perform manual work in accordance with procedures.

[Patent Reference 1] Japanese Patent Laid-Open No. 2000-112704
[Patent Reference 2] Japanese Patent Laid-Open No. 2002-509065
[Patent Reference 3] U.S. Pat. No. 6,224,048

The above-described JDF standard has facilitated data management in the printing process in the POD market. In practice, however, main work is manually done by the operator even now in the POD operation environment.

As disclosed in patent references 1 and 2, a post process such as bookbinding is performed for a paper document output from the printing apparatus by using devices called finishers such as a folding machine and cutting machine. In order to obtain a bound product as a final product by using these devices, the operator must sequentially bring printed products (paper sheets) output from the printing apparatus to the respective devices, and perform manual work in accordance with procedures.

To improve this situation, it is conceived to apply standards such as the JDF not only to process management but also to a printing operation performed by the operator and finisher management in respective printing processes in the future. For this purpose, there is a need for a configuration for interpreting a job ticket (e.g., the JDF) described in XML and executing control corresponding to the interpreted contents in the printing operation and various finishers.

At present, however, job ticket-compatible post processing apparatuses have not satisfactorily been lined up. In addition, various finishers used in the POD operation are very expensive. Considering this, it is actually difficult to replace current apparatuses with job ticket-compatible post processing apparatuses. Although management of the printing process and management of data benefit from job tickets such as the JDF, an operation to perform a post process for a printout depends on conventional manual work by the operator. It is hard to say that the productivity of all POD operations increases.

For this reason, techniques of instructing the operator on work, as disclosed in patent references 1 and 2, are still needed. However, the techniques described in patent references 1 and 2 do not consider any method of interpreting data described in a job ticket and creating an order form in accordance with the interpretation result so that the operator can read work contents to be executed by him.

More specifically, in patent reference 1, whether a page has color or monochrome data is automatically determined or specified by an input from the operator for each page of data to be printed. When jobs are output using a color MFP (Multi-Function Peripheral) and monochrome MFP, a PDL unit creates a barcode sheet for instructing the collator on work contents so as to output the barcode sheet together with each job.

In a conventional printing system in which a printing apparatus and post processing apparatus are directly connected, the contents of a post process set by a driver are transmitted as a post process command to the post processing apparatus via the printing apparatus. The post processing apparatus generally interprets the command to execute the set post process.

Conventionally, the post processing apparatus directly connected to the printing apparatus is instructed on a process by a command. The technique in patent reference 1 only replaces a command with an interpretable barcode when the post processing apparatus is not directly connected to the printing apparatus.

That is, the technique described in patent reference 1 is established under a preliminary agreement which enables generating/interpreting a command, barcode, and the like. This technique cannot be applied to another environment. As described above, a POD operation is manually executed by the operator using apparatuses suited to various post processes. Also as described above, these apparatuses cannot interpret commands common to a printing data generation device and post processing device in patent reference 1.

The system in patent reference 1 does not consider a main case in current POD operations in which the operator uses a plurality of types of post processing apparatuses (e.g., a folding machine, cutting machine, and gluing machine), and sequentially executes manual work operations using the post processing apparatuses for paper sheets output from the printing apparatus, thereby obtaining a final product (bound product). The system in patent reference 1 does not provide any fundamental solution to problems in the current POD operation environment.

The techniques in patent references 2 and 3 more conform to the current POD operation environment because a command readable by a finisher and a text readable by the user (operator) are output onto a cover sheet.

Patent references 2 and 3 disclose that the cover sheet describes, as user-readable information, instructions for folding, stitching, and the like in steps after stacking together with information on a paper stock, a stacking order, and a printer used for a plurality of outputs which form a composite document. However, no concrete method of generating the cover sheet itself is disclosed.

In any case, patent references 1 to 3 do not consider effective utilization of a job ticket for management of the printing process and instruction information at the work level of a post printing process.

SUMMARY OF THE INVENTION

The present invention has been made to overcome the conventional drawbacks, and has as its object to provide an information processing apparatus capable of giving a proper work order to the operator regardless of the contents of a post process and the configuration of a post processing apparatus in a printing environment in which a plurality of types of post processes including printing are performed using a plurality of post processing apparatuses, a control method therefor, and a program.

According to the present invention, the foregoing object is attained by providing an information processing apparatus which generates, on the basis of job management information of a printing job for a printing system that implements various processes by a printing apparatus and a post processing apparatus, work order form data of a post printing process to be executed by the post processing apparatus, comprising:

analysis means for analyzing the job management information;

extraction means for extracting post printing process information on the post printing process from the job management information on the basis of an analysis result of the analysis means;

stylesheet storing means for storing a stylesheet for reflecting the post printing process information in a predetermined format; and generation means for generating work order form data of the post printing process on the basis of the stylesheet stored in the stylesheet storing means and the post printing process information.

In a preferred embodiment, the apparatus further comprises output means for outputting the work order form data generated by the generation means.

In a preferred embodiment, the output means outputs the work order form data to a printing apparatus connected via a network.

In a preferred embodiment, the output means includes printing means for printing a work order form based on the work order form data.

In a preferred embodiment, the stylesheet storing means stores a plurality of types of stylesheets corresponding to combinations of types of post printing processes and process orders, and the information processing apparatus further comprises selection means for selecting, from the stylesheet storing means, a stylesheet corresponding to a type of the post printing process that is represented by the post printing process information extracted by the extraction means.

In a preferred embodiment, the apparatus further comprises holding means for holding post processing apparatus information on a post processing apparatus which executes the post printing process, wherein the generation means generates work order form data of the post printing process on the basis of the post processing apparatus information, the stylesheet selected by the selection means, and the post printing process information.

In a preferred embodiment, the post processing apparatus information includes an image of the post processing apparatus.

In a preferred embodiment, wherein the generation means generates a display image by compositing a predetermined page image together with the image of the post processing apparatus on the basis of the post printing process information and the printing job.

In a preferred embodiment, the apparatus further comprises holding means for holding operation unit information on an operation unit of a post processing apparatus which executes the post printing process, wherein the generation means generates work order form data of the post printing process on the basis of the operation unit information, the stylesheet selected by the selection means, and the post printing process information.

In a preferred embodiment, the operation unit information includes an image of the operation unit of the post processing apparatus, and the generation means generates a display image including a parameter setting value to be displayed at a predetermined position of the image of the operation unit in accordance with the post printing process information.

In a preferred embodiment, the apparatus further comprises operator information storing means for storing operator information on an operator of the post processing apparatus, wherein the selection means refers to the operator information storing means to select operator information of a post processing apparatus which executes the post printing process represented by the post printing process information extracted by the extraction means, and the generation means generates work order form data corresponding to the operator information selected by the selection means.

In a preferred embodiment, the operator information includes skill information representing a level of proficiency of an operator at the post processing apparatus.

In a preferred embodiment, the apparatus further comprises post processing apparatus information storing means for storing post processing apparatus information containing a type of the post processing apparatus, a setting item of each type of post processing apparatus, and post processing apparatus information containing priority, wherein the stylesheet storing means stores a plurality of types of stylesheets corresponding to the post processing apparatus information, and the selection means refers to the post processing apparatus information storing means to select post processing apparatus information corresponding to the post printing process information extracted by the extraction means, and selects a stylesheet corresponding to the selected post processing apparatus information from the stylesheet storing means.

In a preferred embodiment, the priority includes at least one of a priority for each type of post processing apparatus, a priority for each setting item, and a priority set for the post processing apparatus information.

In a preferred embodiment, the selection means refers to the post processing apparatus information storing means and generates, on the basis of the number of post printing processes, types of the post printing processes, and setting items that are represented by the post printing process information extracted by the extraction means, combination information of post processing apparatus information that satisfies the post printing process information, and when pieces of combination information exist, selects combination information formed from a combination having the highest priority from the pieces of combination information, and selects a stylesheet corresponding to the selected combination information from the stylesheet storing means.

In a preferred embodiment, when a plurality of stylesheets corresponding to the combination information exist, the selection means selects a stylesheet corresponding to the combination information from the plurality of stylesheets in the stylesheet storing means on the basis of an arrangement position of the post processing apparatus in the printing system, a type of post printing process executable by the post processing apparatus, and a preset priority that are defined by the stylesheet.

According to the present invention, the foregoing object is attained by providing a method of controlling an information processing apparatus which generates, on the basis of job management information of a printing job for a printing system that implements various processes by a printing apparatus and a post processing apparatus, work order form data of a post printing process to be executed by the post processing apparatus, comprising:

an analysis step of analyzing the job management information;

an extraction step of extracting post printing process information on the post printing process from the job management information on the basis of an analysis result of the analysis step; and a generation step of generating work order form data of the post printing process on the basis of the post printing process information, and a stylesheet stored in a stylesheet storing unit which stores a stylesheet for reflecting the post printing process information in a predetermined format.

According to the present invention, the foregoing object is attained by providing a program for implementing control of an information processing apparatus which generates, on the basis of job management information of a printing job for a printing system that implements various processes by a printing apparatus and a post processing apparatus, work order form data of a post printing process to be executed by the post processing apparatus, comprising:

a program code for an analysis step of analyzing the job management information;

a program code for an extraction step of extracting post printing process information on the post printing process from the job management information on the basis of an analysis result of the analysis step; and a program code for a generation step of generating work order form data of the post printing process on the basis of the post printing process information, and a stylesheet stored in a stylesheet storing unit which stores a stylesheet for reflecting the post printing process information in a predetermined format.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 9 is a flowchart showing a work order form generation process by the printing system according to the first embodiment of the present invention;

FIG. 10 is a view showing a concrete example of JDF data according to the first embodiment of the present invention;

FIG. 11 is a view showing a concrete example of a stylesheet according to the first embodiment of the present invention;

FIG. 12 is a view showing an example of the structure of the stylesheet according to the first embodiment of the present invention;

FIG. 13 is a view showing a concrete example of a work order form generated by applying a stylesheet to JDF data according to the first embodiment of the present invention;

FIG. 30 is a view showing a concrete example of a work order form generated by applying a stylesheet to JDF data according to the sixth embodiment of the present invention;

FIG. 32 is a table showing an example of an operator skill table according to the seventh embodiment of the present invention;

FIG. 34 is a view showing a concrete example of the work order form generated by applying a stylesheet to JDF data according to the seventh embodiment of the present invention;

FIG. 37 is a view for explaining an example of the type of post printing process and the setting item according to the eighth embodiment of the present invention;

FIG. 38 is a view showing an example of a finisher information table according to the eighth embodiment of the present invention;

FIG. 39 is a view showing a concrete example of a work order form generated by applying a stylesheet to JDF data according to the eighth embodiment of the present invention;

FIG. 42 is a view showing an example of stylesheet information according to the ninth embodiment of the present invention.

DETAILED DESCRIPTION OF THE PREFERRED EMBODIMENTS

Preferred embodiments of the present invention will be described in detail in accordance with the accompanying drawings.

In the following embodiments, the above-described JDF format will be employed and explained as a job ticket. However, the present invention is not limited to only the JDF format, but may be applied to any job ticket.

The job ticket in the present invention means a data file which describes various kinds of process information on at least a placed printing order. The process information includes definition information on executing a pre-printing process (whether a proof exists) on submitted printing data, a printout process (e.g., color/monochrome setting information or single/double-side setting information), and a post printing process (e.g., finishing process).

First Embodiment

The first embodiment pays attention to effectively utilizing, even at the work level of a post printing process, a feature of JDF data which describes information on a post process in advance. The first embodiment provides a printing system capable of giving a proper work order to the operator on the basis of information described in JDF data regardless of the contents of the post process and the configuration of the post processing apparatus. This system implements supports for the operator and high efficiency of all POD operations in the current POD operation environment.

Figure 1:
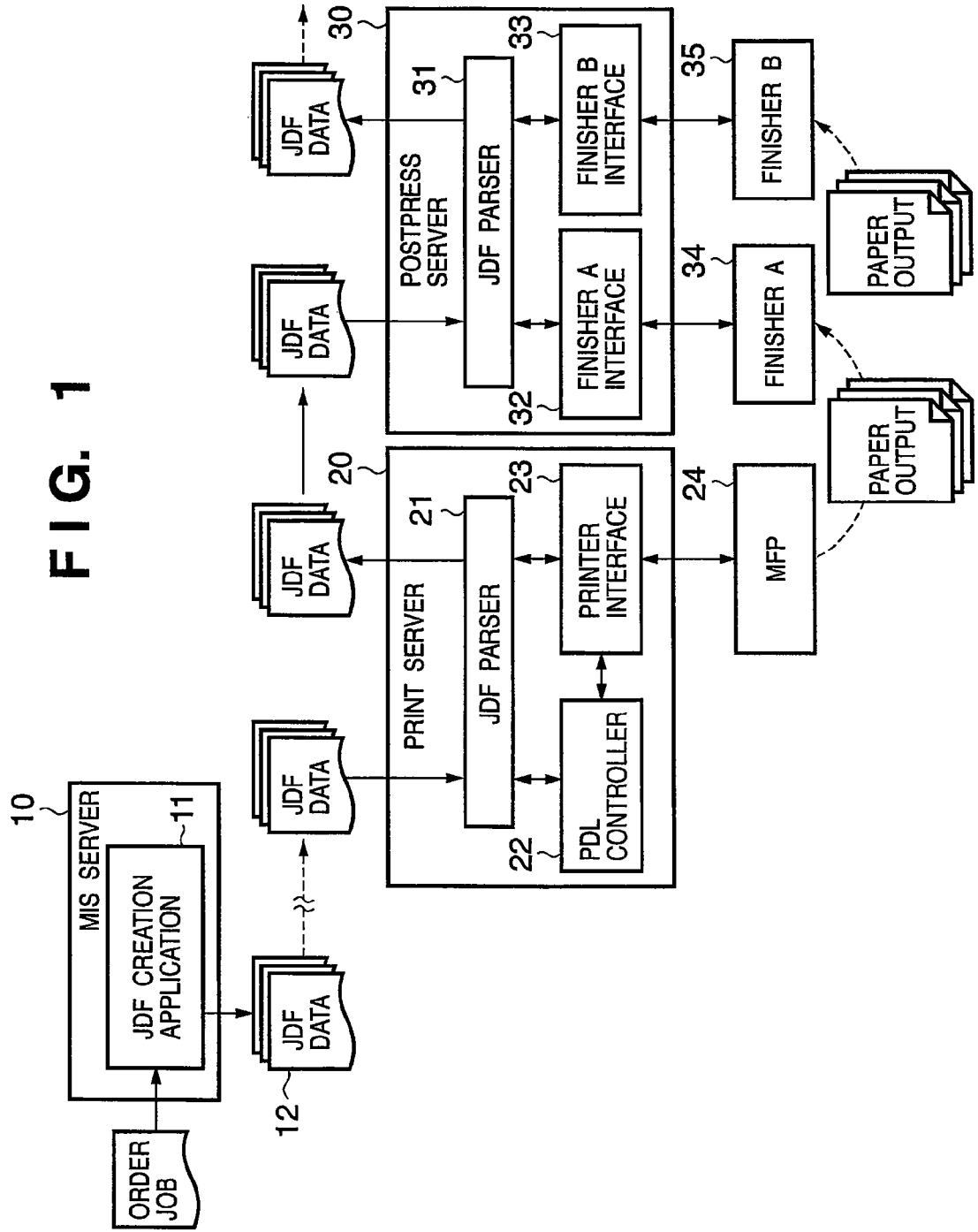
FIG. 1 is a block diagram showing an example of the workflow configuration of a printing system according to the first embodiment of the present invention.

FIG. 1 is a block diagram showing an example of the workflow configuration of the printing system according to the first embodiment of the present invention.

Note that the printing system in FIG. 1 is an example of a printing system implemented by JDF data serving as management information (job management information) in various processes (jobs) including a printing process and various post printing processes.

In FIG. 1, an MIS server 10 is a system which manages the workflow of the whole system from reception of an order to delivery, and comprehensively manages various kinds of management information and sales information. The MIS server 10 comprises a JDF (Job Definition Format) creation application 11 for creating JDF data 12 corresponding to a job ticket that describes a work order in the workflow.

A print server 20 receives a job input to an MFP 24 serving as a digital printing unit, and manages and controls the overall MFP 24. The print server 20 comprises a JDF parser 21 for interpreting JDF data, a PDL controller 22 for processing various PDL data such as PDF/PS, and a printer interface 23 for connecting a printer engine such as an MFP.

A postpress server 30 receives a job input to a finisher serving as a postpress unit (post processing unit), and comprehensively manages all finishers. The postpress server 30 comprises a JDF parser 31 for interpreting JDF data, and a finisher interface for connecting at least one finisher (post processing apparatus).

In FIG. 1, the postpress server 30 comprises a finisher A interface 32 and finisher B interface 33 for connecting a finisher A 34 and finisher B 35. However, in accordance with a necessary number of finishers, a corresponding finisher interface is constructed in the postpress server 30.

A workflow based on a job ticket is implemented as follows.

When an order job is input to the MIS server 10, the operator uses the JDF creation application 11 installed in the MIS server 10 to create JDF data 12 corresponding to a job ticket which describes a work order in the workflow.

When the created JDF data 12 is transferred to the print server 20, the JDF parser 21 of the print server 20 interprets the JDF data, and executes a job for the MFP 24. For example, the JDF data designates attributes such as the output paper size, single/double-side printing, and N-up. In accordance with the contents of the JDF data, the PDL controller 22 processes PDL data such as PDF/PS to be referred to by the JDF data. The PDL controller 22 causes the MFP 24 via the printer interface 23 to print.

When the JDF data created by the print server 20 is transferred to the postpress server 30, the JDF parser 31 in the postpress server 30 interprets the JDF data, and executes a job for a finisher. For example, the JDF data designates attributes such as case biding, saddle stitching, and cutting. In accordance with the contents of the JDF data, the JDF parser 31 causes the finisher A 34 and finisher B 35 via the finisher A interface 32 and finisher B interface 33 to execute post processes (post printing processes).

The configuration of a POD system will be explained with reference to FIGS. 2 and 3.

Figure 2:
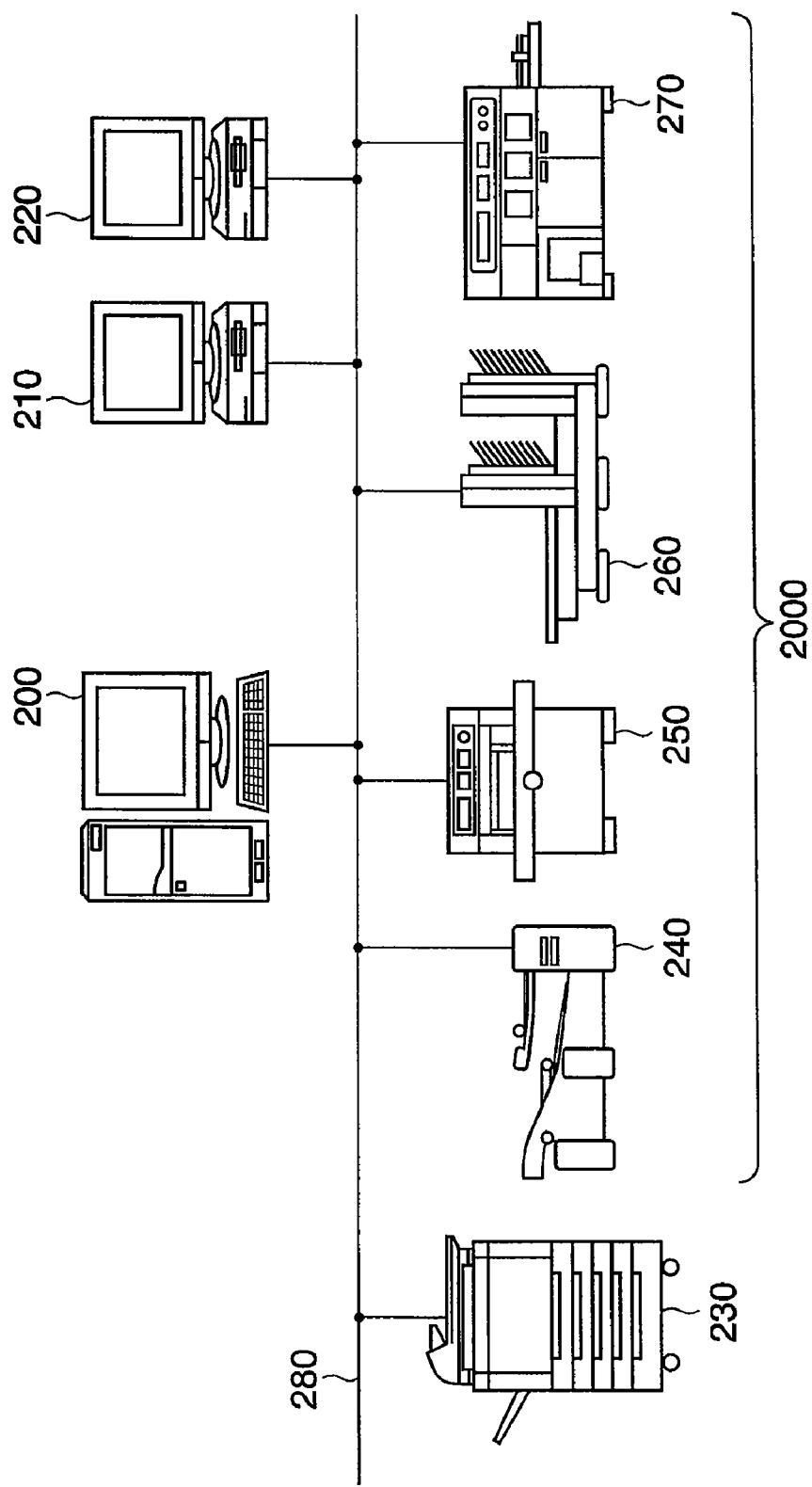
FIG. 2 is a view showing an example of the configuration of a POD system according to the first embodiment of the present invention.

FIG. 2 is a view showing an example of the configuration of the POD system according to the first embodiment of the present invention.

FIG. 2 shows a POD system in which client PCs 210 and 220 for transmitting submitted data, a server 200 for receiving submitted data and generating JDF data, a color MFP 230 for printing data, and a near-line finisher group 2000 (folding machine 240, cutting machine 250, saddle stitching machine 260, case binding machine 270, and the like) are connected to each other via a network 280.

Various devices which construct the POD system transfer JDF data in the order of the client PC 210 (or 220)→the server 200→the color MFP 230→the near-line finisher group 2000 via the network 280, thereby generating a printed product.

Figure 3:
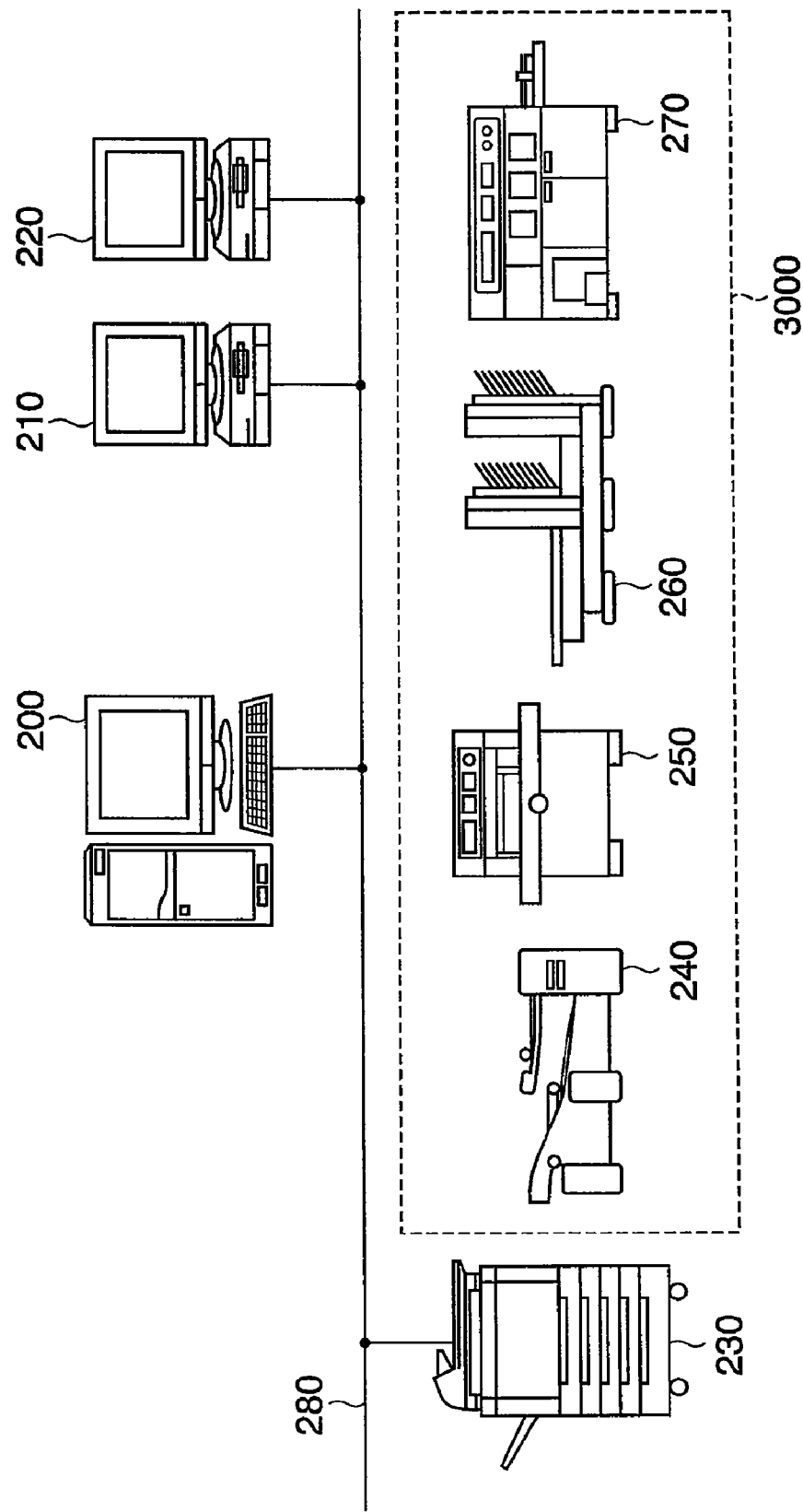
FIG. 3 is a view showing another example of the configuration of the POD system according to the first embodiment of the present invention.

To the contrary, FIG. 3 shows a POD system in which a finisher group (offline finisher group 3000) of the folding machine 240, cutting machine 250, saddle stitching machine 260, case binding machine 270, and the like shown in FIG. 2 is disconnected from the network 280.

In FIGS. 2 and 3, the respective finishers physically stand alone. That is, these finishers do not have a configuration in which output paper printed by a printing device is conveyed by a physical convey means, unlike the above-described inline finisher. A product output from the color MFP 230 is manually conveyed by the operator to a necessary finisher, and then undergoes a post process. If post processes by a plurality of finishers are required, an output product undergoes operations sequentially by the finishers.

The first embodiment will describe a POD system having the offline finisher group 3000 in FIG. 3. Needless to say, the present invention can also be applied to a POD system having the near-line finisher group 2000 in FIG. 2. The present invention can also be applied to a POD system in which an inline finisher, near-line finisher, and offline finisher coexist.

Figure 4:
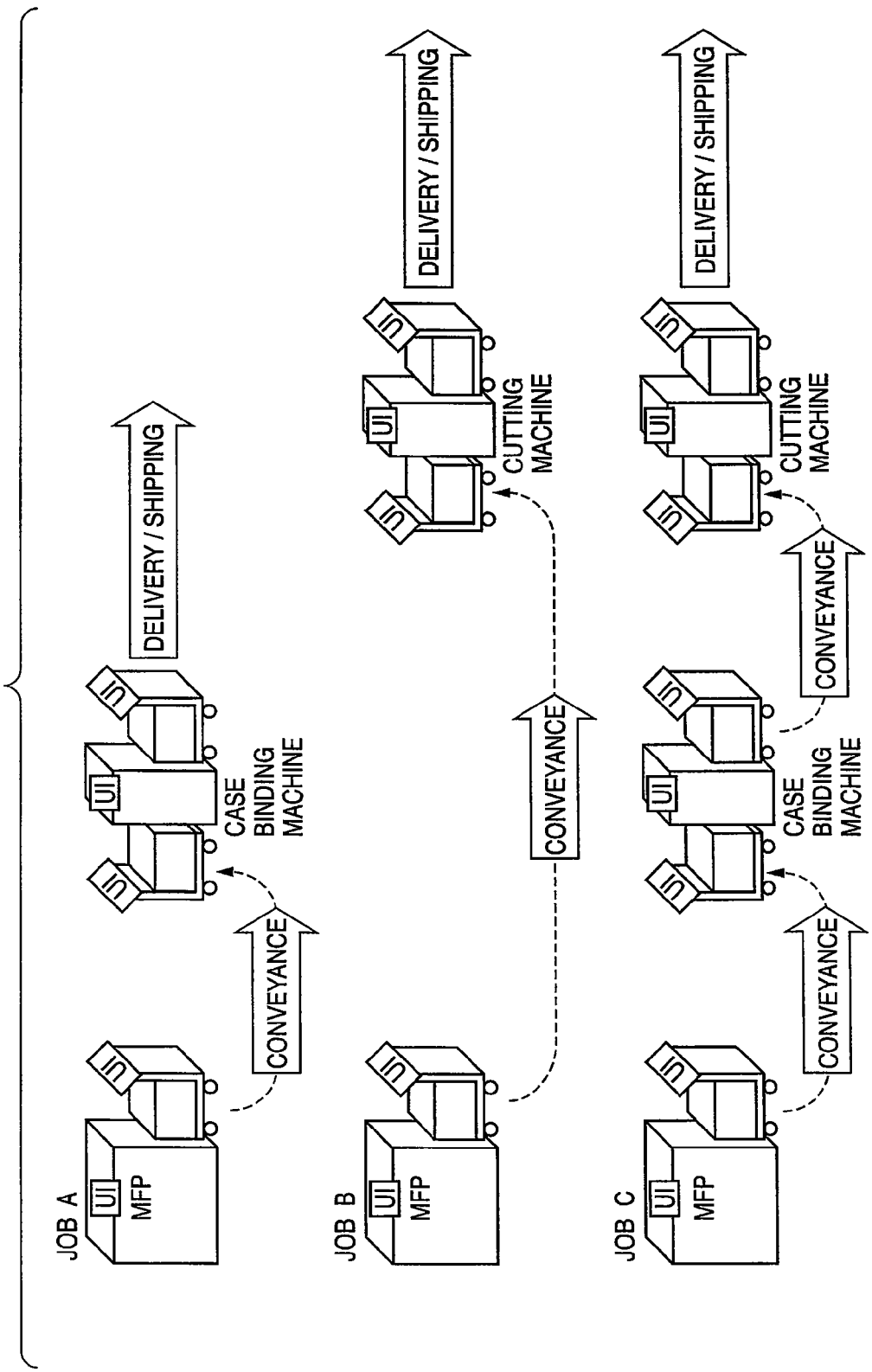
FIG. 4 is a view showing an example of a post printing process according to the first embodiment of the present invention.

The flow of post printing processes using offline finishers is shown in, e.g., FIG. 4. It is apparent from FIG. 4 that an output product (paper) is manually conveyed by the operator to each post printing process, and a different offline finisher is used because the post printing process changes depending on the contents of the process instruction of an input printing job.

For example, for job A, a product output from the MFP is manually conveyed by the operator to the case binding machine, processed by the case binding machine, and then delivered/shipped. For job B, a product output from the MFP is manually conveyed by the operator to the cutting machine, processed by the cutting machine, and then delivered/shipped. For job C, a product output from the MFP is manually conveyed by the operator sequentially to the case binding machine and cutting machine, processed by the respective devices, and then delivered/shipped.

A concrete example of a post printing process (=offline process) using an offline finisher will be explained with reference to FIGS. 5 and 6.

Figure 5:
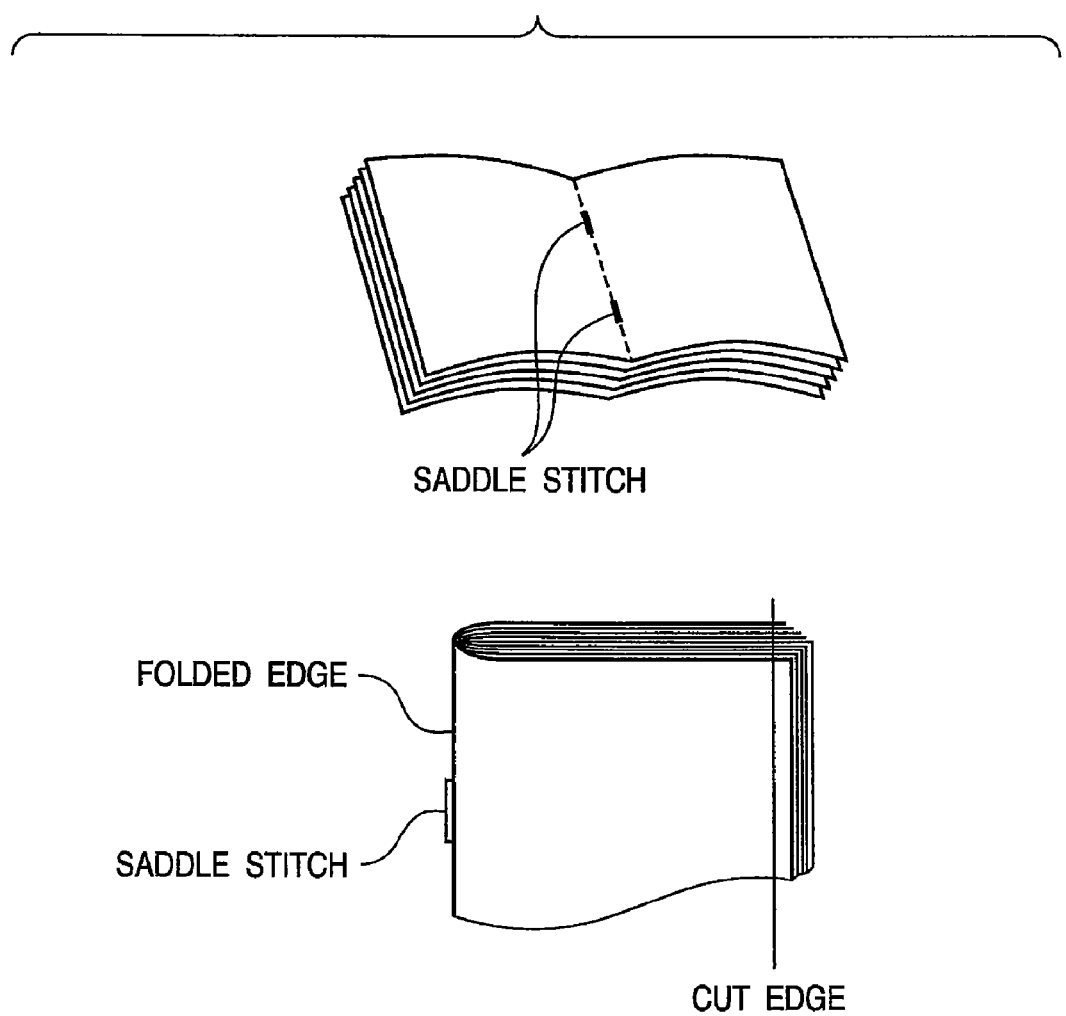
FIG. 5 is a view showing an example of bookbinding by saddle stitching according to the first embodiment of the present invention.

FIG. 5 is a view showing an example of bookbinding by saddle stitching according to the first embodiment of the present invention.

As shown in FIG. 5, a product (paper) output from the color MFP is stitched at the center of the paper, folded in half, cut at a paper edge, and bound. This bookbinding method is called saddle stitching.

Figure 6:
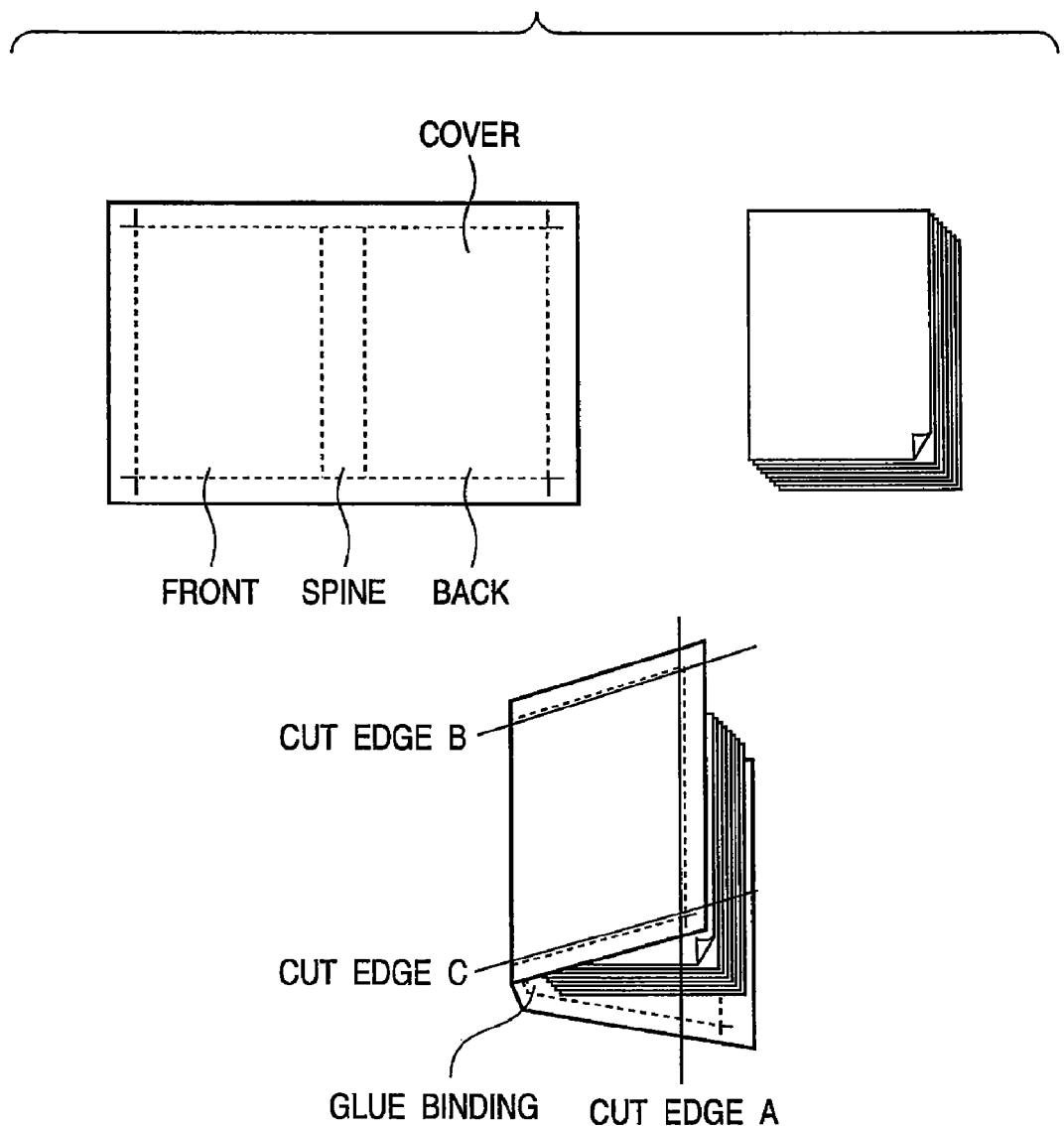
FIG. 6 is a view showing an example of bookbinding by glue binding according to the first embodiment of the present invention.

FIG. 6 is a view showing an example of bookbinding by glue binding according to the first embodiment of the present invention.

As shown in FIG. 6, a product output from the color MFP is covered with a larger cover which is glued at the spine. The output product is cut at paper edges including upper and lower edges, and bound. This bookbinding method is called glue binding.

The configuration of a color system MFP (Multi-Function Peripheral) suitably applied to the first embodiment will be explained with reference to FIG. 7.

Figure 7:
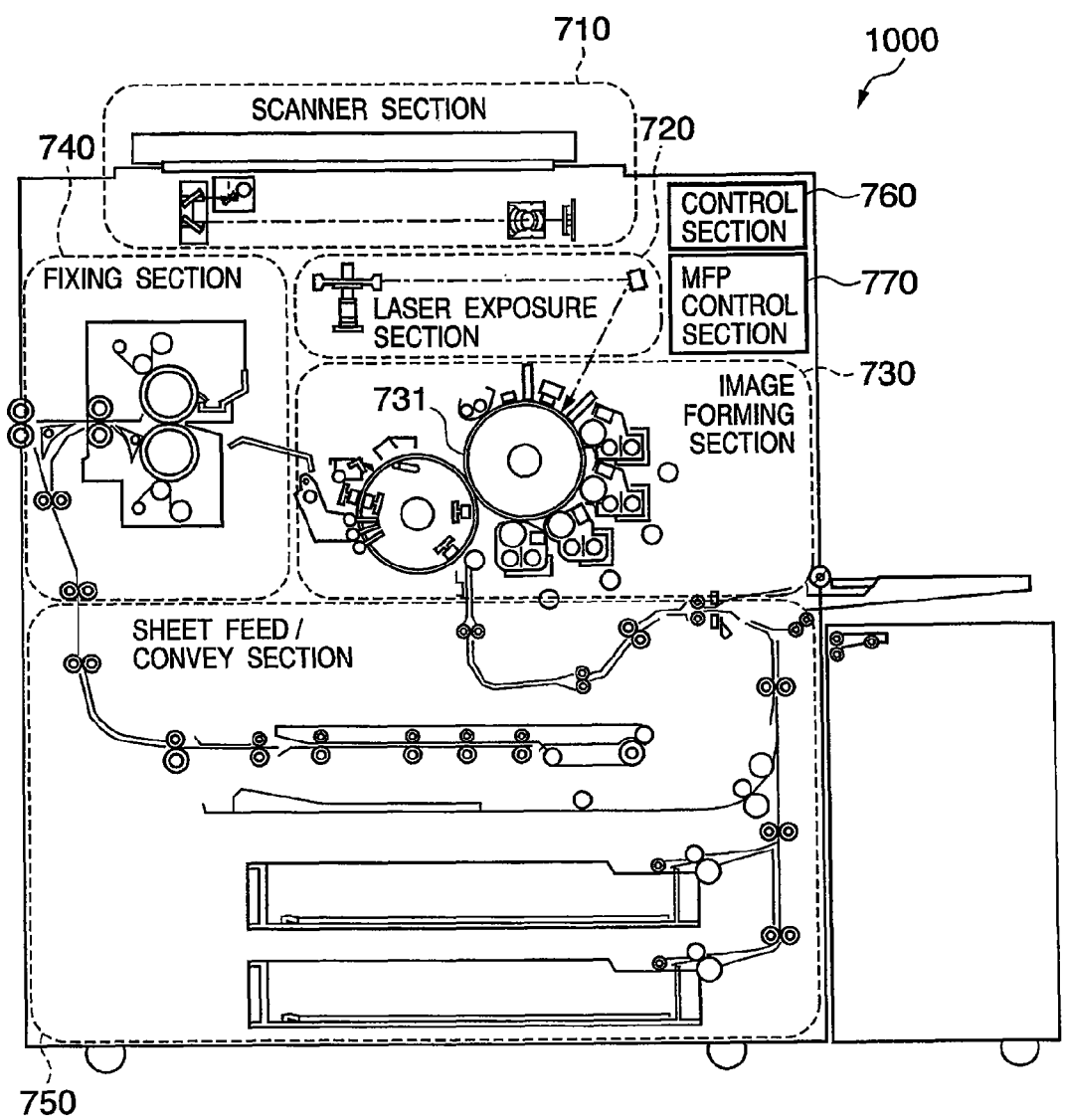
FIG. 7 is a view showing the configuration of an MFP according to the first embodiment of the present invention.

FIG. 7 is a view showing the configuration of the MFP according to the first embodiment of the present invention.

A color system MFP 1000 functioning as an image forming apparatus (printing apparatus) is formed from, as main building components, a scanner section (document exposure section) 710, a laser exposure section 720, an image forming section 730 having a photosensitive drum 731, a fixing section 740, a sheet feed/convey section 750, and a control section 760 which controls these sections.

The scanner section 710 illuminates a document set on a document table, optically reads the document image, and converts the image into an electrical signal to create image data.

The laser exposure section 720 emits a light ray such as a laser beam modulated in accordance with image data created by the scanner section 710, to a rotary polygon mirror which rotates at an equiangular velocity. Then, the laser exposure section 720 irradiates the photosensitive drum 731 with the light ray as reflected scanning light.

The image forming section 730 drives and rotates the photosensitive drum 731, charges it by a charger, and develops with toner a latent image formed on the photosensitive drum 731 by the laser exposure section 720. The image forming section 730 transfers the toner image onto a sheet (printing paper), and recovers a small amount of toner which is not transferred and remains on the photosensitive drum 731. The image forming section 730 executes the series of electrophotographic processes to form an image.

At this time, while the sheet is wound at a predetermined position of the transfer belt and rotates four times, developing units (developing stations) having magenta (M), cyan (C), yellow (Y), and black (K) toners repetitively execute the above-mentioned electrophotographic process in turn. After the sheet rotates four times, the sheet bearing a full-color toner image in the four colors is separated from the transfer drum, and conveyed to the fixing section 740.

The fixing section 740 is formed from a combination of rollers and belts. The fixing section 740 incorporates a heat source such as a halogen heater, and fuses and fixes by heat and pressure the toner on the sheet on which the toner image is transferred by the image forming section 730.

The sheet feed/convey section 750 has at least one sheet stocker typified by a sheet cassette or paper deck. The sheet feed/convey section 750 separates one of sheets stored in the sheet stocker in accordance with an instruction from the control section 760, and conveys the sheet sequentially to the image forming section 730 and fixing section 740. The sheet is wound around the transfer drum of the image forming section 730, rotates four times, and then is conveyed to the fixing section 740. While the sheet rotates four times, toner images of the Y, M, C, and K colors are transferred onto the sheet. To form images on the two sides of the sheet, the sheet having passed through the fixing section 740 is controlled to pass through a convey path and convey the sheet to the image forming section 730 again.

The control section 760 communicates with an MFP control section 770 which controls the whole MFP 1000, and executes control in accordance with an instruction from the MFP control section 770. Also, while the control section 760 manages the states of the scanner section 710, laser exposure section 720, image forming section 730, fixing section 740, and sheet feed/convey section 750, it instructs them to keep the balance and operate smoothly.

The positions of the control section 760 and MFP control section 770 in FIG. 7 are not their physical positions, and are indicated for descriptive convenience.

The internal configuration of the MFP 1000 will be explained with reference to FIG. 8.

Figure 8:
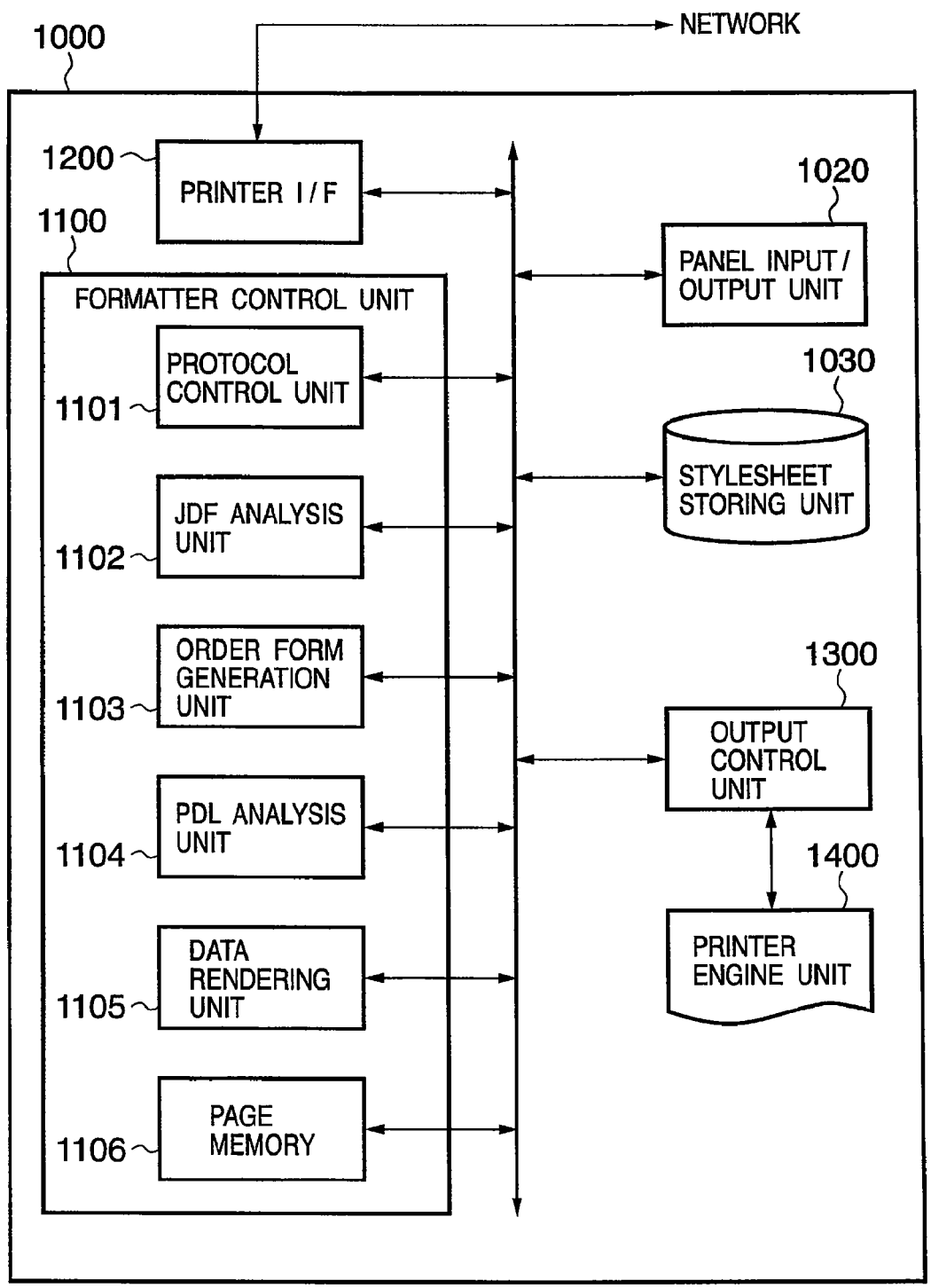
FIG. 8 is a block diagram showing the internal configuration of the MFP according to the first embodiment of the present invention.

FIG. 8 is a block diagram showing the internal configuration of the MFP according to the first embodiment of the present invention.

In FIG. 8, the printing apparatus (MFP) is roughly built by a formatter control unit 1100, panel input/output unit 1020, stylesheet storing unit 1030, printer interface (I/F) 1200, output control unit 1300, and printer engine unit 1400.

The printer I/F 1200 controls an external input and output.

The formatter control unit 1100 is made up of a protocol control unit 1101, JDF analysis unit 1102, order form generation unit 1103, PDL analysis unit 1104, data rendering unit 1105, and page memory 1106.

In general, the formatter control unit 1100 is formed from a computer system having a CPU, ROM, RAM, and the like.

In the formatter control unit 1100, the protocol control unit 1101 communicates with the outside by analyzing and transmitting a network protocol. The JDF analysis unit 1102 analyzes received JDF data to recognize a process step and determine whether a post printing process exists. The order form generation unit 1103 composites JDF data and a stylesheet to generate PDL data (work order form data) for outputting a work order form. The PDL analysis unit 1104 analyzes PDL data, and converts it into an intermediate code of an easily processable format. The intermediate code generated by the PDL analysis unit 1104 is transferred to the data rendering unit 1105 and processed by it. The data rendering unit 1105 maps the intermediate code into bitmap data, and the obtained bitmap data are sequentially rendered in the page memory 1106.

The panel input/output unit 1020 controls an input/output to/from the operation panel (formed from, e.g., a touch panel) of the MFP 1000. The stylesheet storing unit 1030 stores a plurality of stylesheets corresponding to the types of post printing processes and their order, and is implemented by, e.g., a secondary storage device such as a hard disk.

Note that the stylesheet functions as layout data for laying out post printing process information (type, order, and process contents) on a post printing process. The stylesheet defines layout information for generating a predetermined format, and information representing which of regions of the format reflects post printing process information of JDF data. Data in which post printing process information is laid out can be output to the printing apparatus, and in addition, to the display unit of an information processing apparatus, and an external apparatus (server, client, external storage device, and the like) connected to a network.

The output control unit 1300 converts the contents of the page memory 1106 into an image signal, and transfers the image to the printer engine unit 1400. The printer engine unit 1400 is a printing mechanism for forming a received image signal into a permanent visible image on printing paper.

The procedures of a whole printing control process according to the first embodiment in the printing system having the above configuration will be explained in turn.

A work order form generation process by the printing system according to the first embodiment will be explained with reference to FIG. 9.

FIG. 9 is a flowchart showing the work order form generation process by the printing system according to the first embodiment of the present invention.

This process is implemented by the MFP 1000. However, the above-described configuration can be applied to the print server 20 to execute the following process in the print server 20.

In step S1301, JDF data is analyzed. The JDF data describes process steps in the XML format. In step S1302, it is determined whether a post printing process is described in the JDF data. If no post printing process is described (NO in step S1302), the process ends; if a post printing process is described (YES in step S1302), the flow advances to step S1303.

In step S1303, a description corresponding to the post printing process is extracted from the JDF data. In step S1304, a stylesheet is selected in accordance with a combination of the types of post printing processes and the process order. The stylesheet suffices to have a format generally used to display the layout of XML data.

In step S1305, the stylesheet is applied to the JDF data. This application process can be easily achieved by a general XML processor which composites and lays out XML data and a stylesheet.

Finally in step S1306, the generated data is rendered as work order form data formed from PDL (rendering) data, and output to the printing unit to generate a work order form.

A concrete example of JDF data will be described with reference to FIG. 10.

FIG. 10 is a view showing a concrete example of JDF data according to the first embodiment of the present invention.

JDF data shown in FIG. 10 describes an order to perform the processes of folding (description 1011), stitching (description 1012), and cutting (description 1013) in the order named. In particular, FIG. 10 shows JDF data which describes processes including post printing processes in the XML format.

An application of the stylesheet to JDF data will be explained in detail.

FIG. 11 is a view showing a concrete example of the stylesheet according to the first embodiment of the present invention.

As shown in FIG. 11, the stylesheet can be easily created using a general XML description format.

FIG. 12 is a view showing an example of the structure of the stylesheet according to the first embodiment of the present invention.

In FIG. 12, three combinations of post printing processes: (1) fold, (2) fold & stitch, and (3) fold & stitch & cut, and corresponding Stylesheets 01 to 03 are stored in a table in the stylesheet storing unit 1030. In accordance with processes described in JDF data to be processed, various stylesheets are selected from the stylesheet storing unit 1030.

In the description example of JDF data in FIG. 10, folding, stitching, and cutting are executed, so Stylesheet 03 is selected.

FIG. 13 is a view showing a concrete example of a work order form generated by applying a stylesheet to JDF data according to the first embodiment of the present invention.

FIG. 13 illustrates the printed product of a work order form generated by applying the stylesheet shown in FIG. 11 to the JDF data shown in FIG. 10. In FIG. 13, the types of post printing processes and their contents are laid out in items "WORK ORDER" and "PARAMETER".

More specifically, information on post printing processes is extracted from the description contents of JDF data, and an optimal stylesheet is selected on the basis of the extracted information. The description contents of the JDF data are conformed to and laid out on the selected stylesheet, thereby creating a work order form readable by the operator, as shown in FIG. 13. The work order form data is included process contents of post printing processes, as shown in FIG. 13.

An outline of a printout process by the MFP will be explained with reference to FIG. 14.

Figure 14:
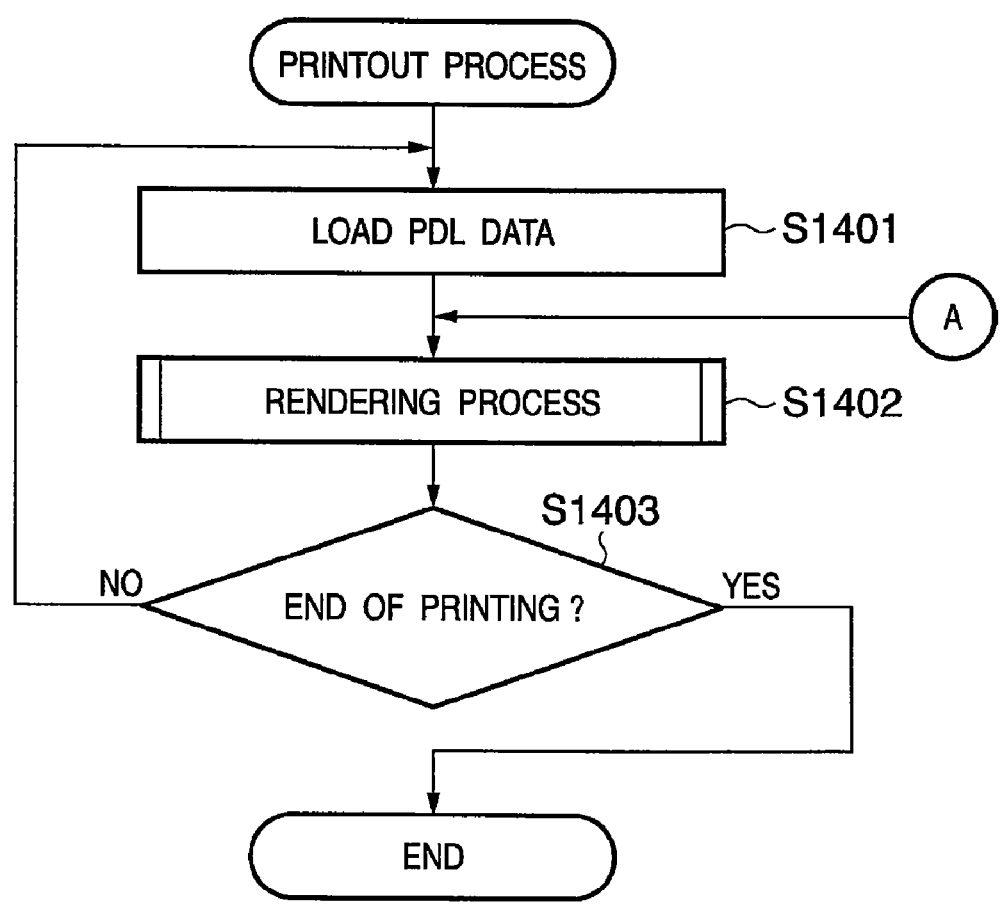
FIG. 14 is a flowchart showing an outline of a printing process by the MFP according to the first embodiment of the present invention.

FIG. 14 is a flowchart showing an outline of the printing process by the MFP according to the first embodiment of the present invention.

This printout process shows details of step S1306 in FIG. 9.

In step S1401, PDL data is loaded. In step S1402, a rendering process is executed. Details of the rendering process will be described later. After the end of the rendering process, it is determined in step S1403 whether unprocessed PDL data remains, i.e., whether to end printing. If unprocessed PDL data remains (NO in step S1403), the flow returns to step S1401; if no unprocessed PDL data remains (YES in step S1403), the process ends.

Details of the rendering process in step S1402 of FIG. 14 will be explained with reference to FIG. 15.

Figure 15:
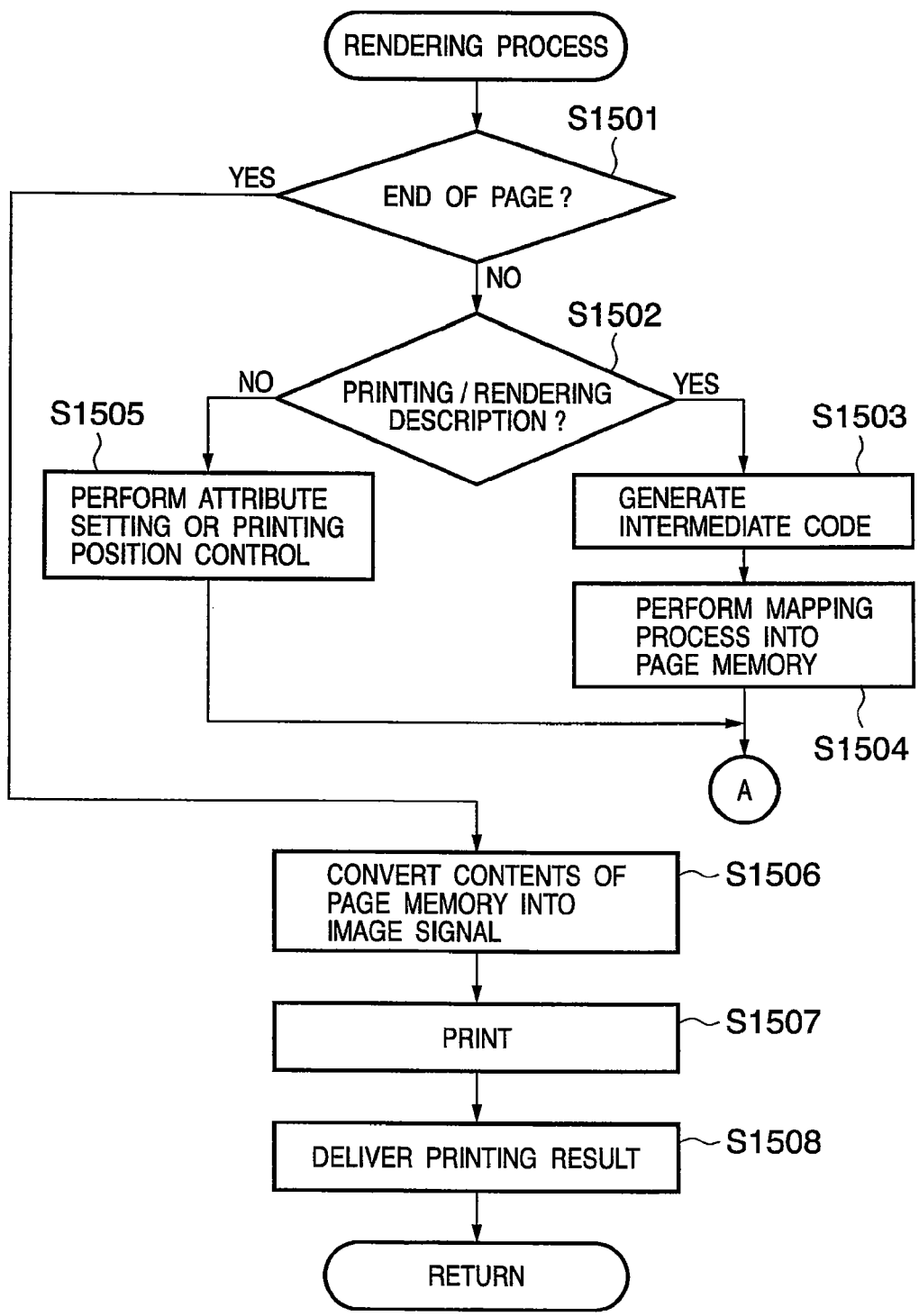
FIG. 15 is a flowchart showing details of a rendering process in step S1402 according to the first embodiment of the present invention.

FIG. 15 is a flowchart showing details of the rendering process in step S1402 according to the first embodiment of the present invention.

This process is a printing control process of executing actual printing.

In step S1501, the PDL analysis unit 1104 determines whether PDL data to be processed represents the end of the page. If the PDL data represents the end of the page (YES in step S1501), the flow advances to step S1506; if the PDL data does not represent the end of the page (NO in step S1501), to step S1502.

In step S1502, it is determined whether an analyzed description in the PDL data requires a mapping process (e.g., text printing or graphic rendering) into the page memory 1106.

If the description does not require any mapping process (NO in step S1502), the flow advances to step S1505 to immediately perform a process complying with the description (e.g., attribute setting or printing position control). If the description requires the mapping process (YES in step S1502), the flow advances to step S1503 to generate an intermediate code of a format which facilitates the mapping process into bitmap data. In step S1504, upon reception of the intermediate code, the data rendering unit 1105 executes the mapping process into the page memory 1106. After the end of the mapping process, the flow returns to step S1402 in FIG. 14 to repeat the PDL data analysis process.

If the PDL data represents the end of the page in step S1501 (YES in step S1501), the process advances to step S1506. The output control unit 1300 converts the contents of the page memory 1106 into an image signal to the printer engine unit 1400, and outputs and transfers the image. In step S1507, the printer engine unit 1400 forms the received image signal into a permanent visible image, and prints the image on printing paper. In step S1508, the printing result is delivered, and the printing control process for one page ends.

A stylesheet registration process of registering a stylesheet in the stylesheet storing unit 1030 will be explained with reference to FIG. 16.

Figure 16:
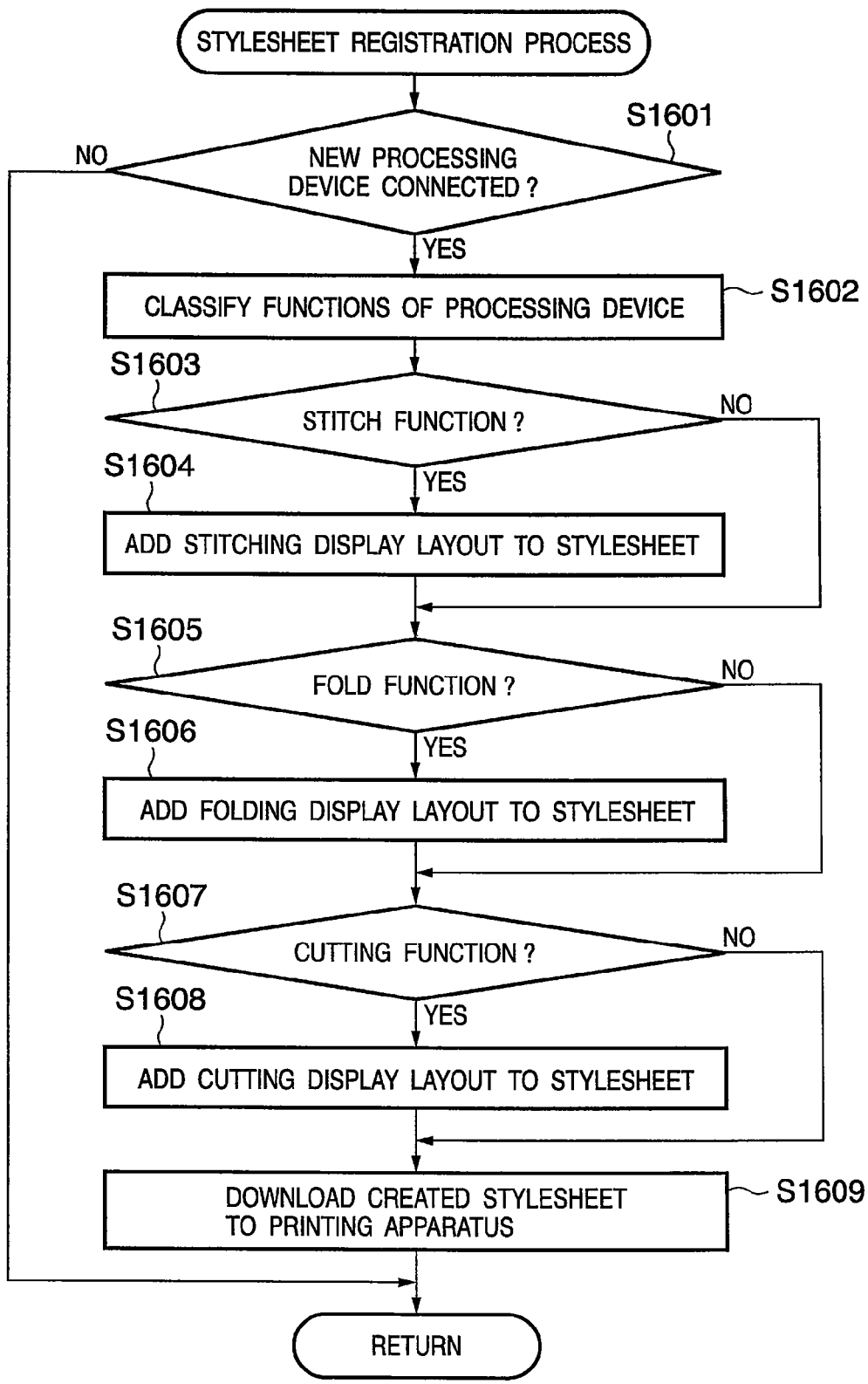
FIG. 16 is a flowchart showing a stylesheet registration process according to the first embodiment of the present invention.

FIG. 16 is a flowchart showing the stylesheet registration process according to the first embodiment of the present invention.

Note that the stylesheet registration process is generally implemented using a general application in an external apparatus (e.g., PC) connected to the MFP 1000. Alternatively, the stylesheet registration process may also be implemented in the MFP 1000.

In step S1601, it is determined whether a new processing device (offline finisher) is installed.

This determination is based on an instruction input which is based on a user operation and represents whether a new processing device is installed.

If no new processing device is installed in step S1601 (NO in step S1601), the process ends; if a new processing device is installed (YES in step S1601), the stylesheet need to be updated, and the flow advances to step S1602 to classify the functions of the processing device. The functions of the processing device mean various functions such as folding, stitching, and cutting, and processing devices include single-function processing devices and multi-function processing devices. Processing devices are classified by displaying a list of functions to be registered, and displaying an operation window capable of selecting a desired function from the list.

In steps S1603 to S1608, functions are registered one by one. For example, three functions: stitching (stitch function), folding (fold function), and cutting (cut function) will be explained. Each function is determined on the basis of an instruction input which is based on a user operation and represents whether each function exists.

In step S1603, it is determined whether the processing device has the stitch function. If the processing device does not have any stitch function (NO in step S1603), the flow advances to step S1605; if the processing device has the stitch function (YES in step S1603), to step S1604 to add a stitching display layout to the stylesheet.

In step S1605, it is determined whether the processing device has the fold function. If the processing device does not have any fold function (NO in step S1605), the flow advances to step S1607; if the processing device has the fold function (YES in step S1605), to step S1606 to add a folding display layout to the stylesheet.

In step S1607, it is determined whether the processing device has the cut function. If the processing device does not have any cut function (NO in step S1607), the flow advances to step S1609; if the processing device has the cut function (YES in step S1607), to step S1608 to add a cutting display layout to the stylesheet.

Finally in step S1609, the created stylesheet is downloaded to the MFP 1000 via a network 104, holding the stylesheet in the stylesheet storing unit 1030.

Note that the stylesheet registration process is not limited to the above configuration. For example, the stylesheet registration process can also be implemented by determining the types of existing processing machines and their functions by the operator, creating an XML code as shown in FIG. 11 by a text editor or the like, and saving the XML code. The stylesheet registration process can also be implemented by creating an XML code using a dedicated application which automatically describes an XML code, and saving the XML code.

A stylesheet selection process of selecting a stylesheet will be explained with reference to FIG. 17.

Figure 17:
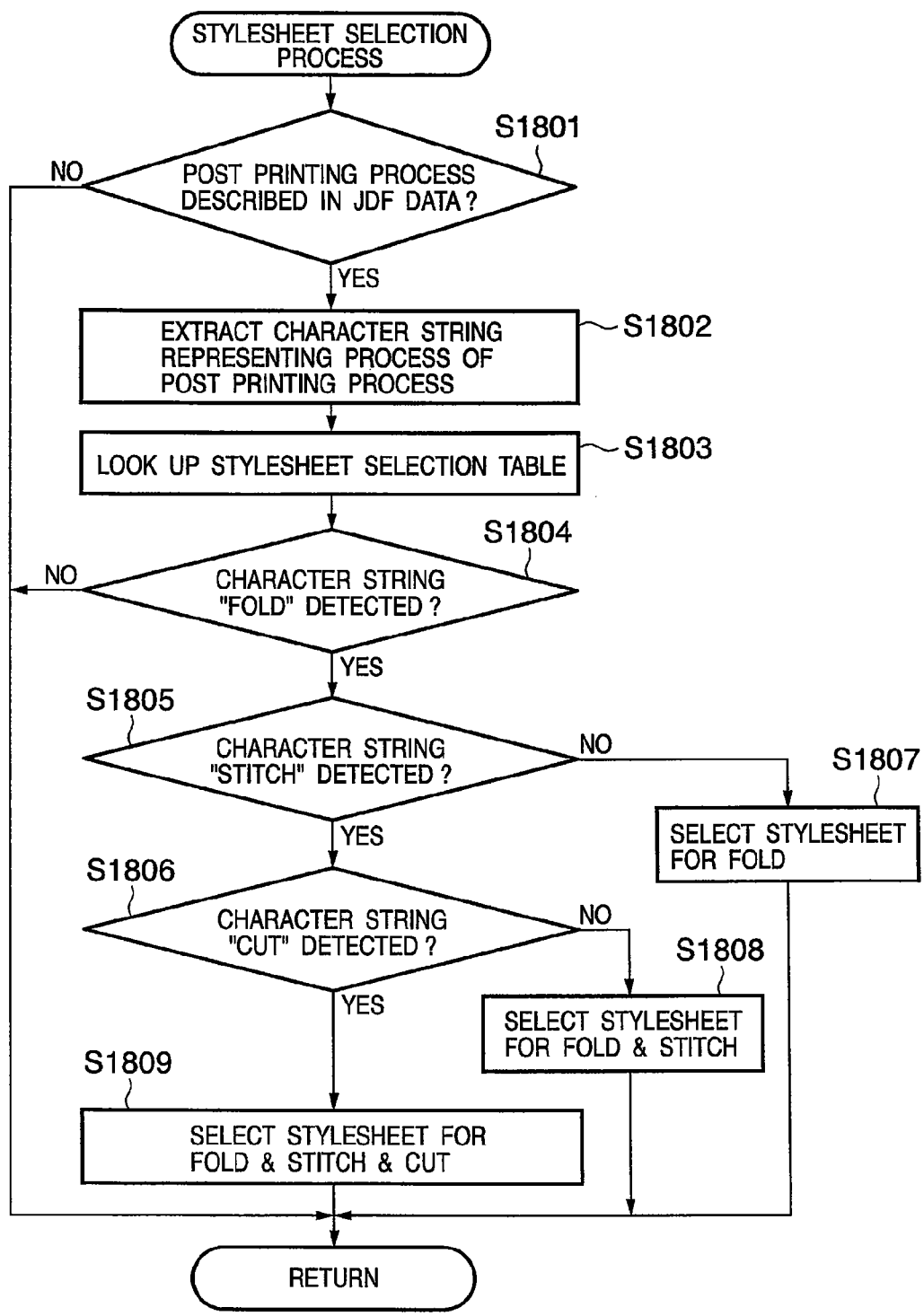
FIG. 17 is a flowchart showing a stylesheet selection process according to the first embodiment of the present invention.

FIG. 17 is a flowchart showing the stylesheet selection process according to the first embodiment of the present invention.

This process shows details of processes in steps S1301 to S1304 in FIG. 9.

In step S1801, it is determined from JDF data whether a post printing process (offline process) is described. If no post printing process is described (NO in step S1801), the process ends; if a post printing process is described (YES in step S1801), the flow advances to step S1802.

In the example of FIG. 10, a plurality of process steps are designated at a description 1010 <JDF . . . Types=" . . . ">. Hence, the presence/absence of a description of a post printing process is determined on the basis of the contents of the description 1010. In this case, a process which cannot be implemented by an inline process due to the system configuration is determined as a post printing process (offline process).

In step S1802, post printing process information on the post printing process is acquired. More specifically, a character string representing a post printing process is extracted from the JDF data.

In the example of FIG. 10, a character string "folding stitching cutting" in "Types=DisitalPrinting folding stitching cutting . . . " represent post printing processes, and part or all of this character string is extracted.

In step S1803, a stylesheet selection table is looked up by using the extracted information. The stylesheet selection table corresponds to the left table in FIG. 12.

In step S1804, it is determined whether the character string "fold" extracted from the JDF data exists in the stylesheet selection table. If no character string "fold" can be detected (NO in step S1804), the process ends; if the character string "fold" can be detected (YES in step S1804), the flow advances to step S1805.

In step S1805, it is determined whether the character string "stitch" extracted from the JDF data exists in the stylesheet selection table. If no character string "stitch" can be detected (NO in step S1805), the flow advances to step S1807 to select a stylesheet for fold; if the character string "stitch" can be detected (YES in step S1805), the flow advances to step S1806.

In step S1806, it is determined whether the character string "cut" extracted from the JDF data exists in the stylesheet selection table. If no character string "cut" can be detected (NO in step S1806), the flow advances to step S1808 to select a stylesheet for fold & stitch; if the character string "cut" can be detected (YES in step S1806), the flow advances to step S1809 to select a stylesheet for fold & stitch & cut.

In the example of FIG. 12, Stylesheet 01 is selected in step S1807; Stylesheet 02, in step S1808; and Stylesheet 03, in step S1809.

As described above, the first embodiment can provide a printing system capable of giving a proper work order form to the operator regardless of the contents of a post process and the configuration of a post processing apparatus on the basis of information described in JDF data. This system implements supports for the operator and high efficiency of all POD operations in the current POD operation environment.

Second Embodiment

The first embodiment has described a configuration in which a work order form is generated on the basis of information designated (described) in JDF data. To the contrary, in the second embodiment, device dependence information of an offline finisher that is not described in JDF data is described in a stylesheet when the offline finisher is installed. The second embodiment will describe a configuration in which the device dependence information is utilized to, for example, when generating a work order form to prevent the cutting machine from cutting an output product of a thickness exceeding the ability of the cutting machine.

A stylesheet registration process according to the second embodiment will be explained with reference to FIG. 18.

Figure 18:
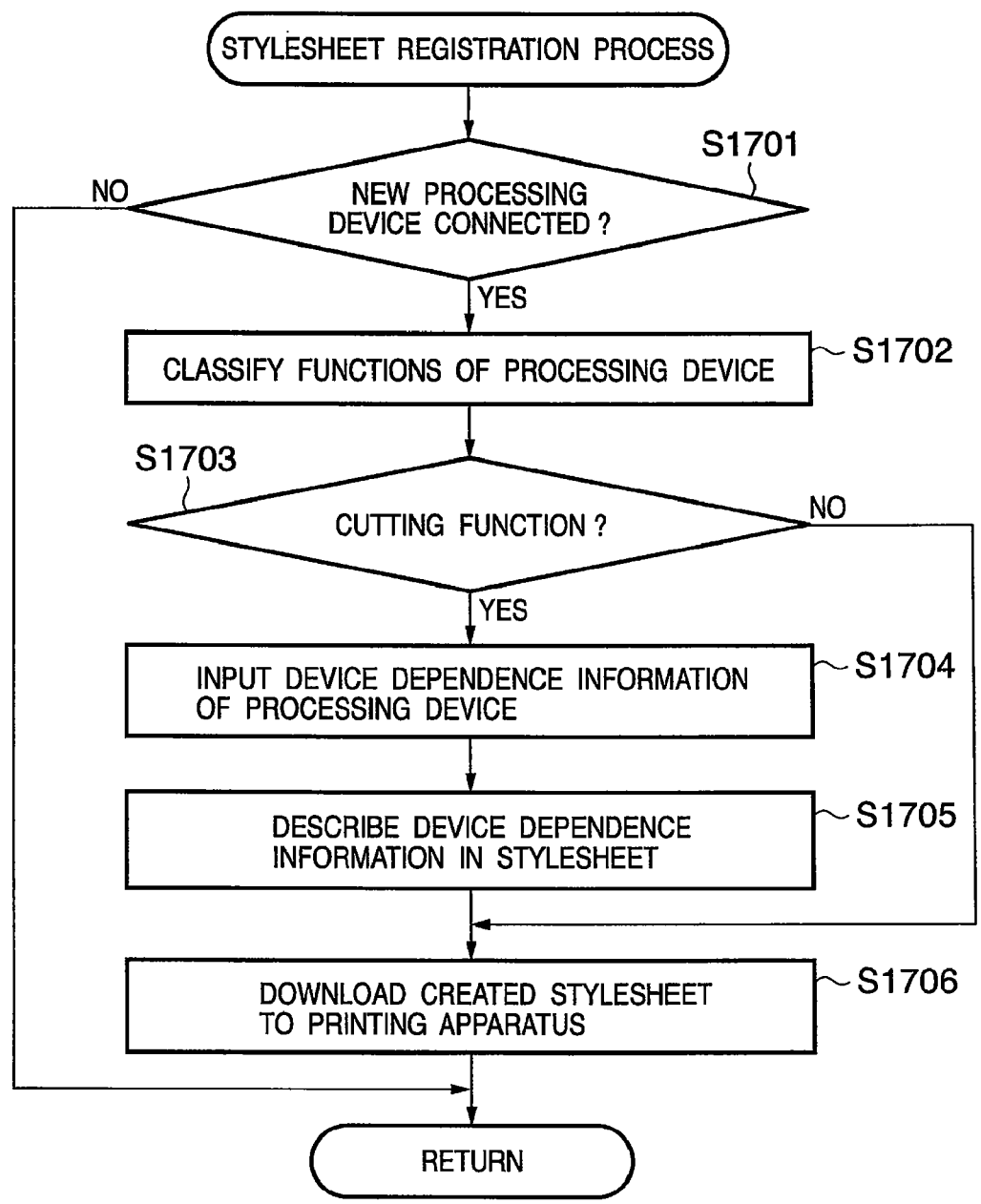
FIG. 18 is a flowchart showing a stylesheet registration process according to the second embodiment of the present invention.

FIG. 18 is a flowchart showing the stylesheet registration process according to the second embodiment of the present invention.

In FIG. 18, a case wherein a processing device having a cutting function is installed as a new processing device will be exemplified. Steps S1701, S1702, and S1706 correspond to steps S1601, S1602, and S1609 in FIG. 16, and a detailed description thereof will be omitted.

After processes in steps S1701 and S1702, it is determined in step S1703 whether the installed device is a processing device having the cutting function. If the installed device is not a processing device having the cutting function (NO in step S1703), the flow advances to step S1706; if the installed device is a processing device having the cutting function (YES in step S1703), to step S1704.

In step S1704, device dependence information containing information representing a thickness cuttable by the processing device is input to an application which creates a stylesheet. The cuttable thickness may be described in JDF data created by the POD system or manually input by an operator who creates a stylesheet.

In step S1705, the input device dependence information (information representing a cuttable thickness) is described in the stylesheet. In step S1706, the created stylesheet is downloaded to an MFP 1000 via a network 104, holding the stylesheet containing the device dependence information in a stylesheet storing unit 1030.

In FIG. 18, a processing device having the cutting function has been exemplified. For another function, corresponding device dependence information can be registered in the stylesheet by the same flow.

As described above, according to the second embodiment, in addition to the effects described in the first embodiment, device dependence information of a finisher used can be reflected in a stylesheet to generate the stylesheet whose contents are proper for the ability of each finisher.

Third Embodiment

In the first embodiment, folding, stitching, and cutting have been described as examples of the post printing process. However, the present invention can also be applied to another process as far as the process is a post printing one.

In the second embodiment, if the character string of a post printing process in JDF data is not found in the stylesheet selection table, the process directly ends. Alternatively, the operator may be prompted to register a new stylesheet.

Fourth Embodiment

In the above-described POD business, work is often divided between a plurality of operators depending on the post process operation.

However, when a plurality of operators do a series of post process operations, all of them neither always equally understand how to operate the apparatus, nor have the work ability (skill) of the same level. In some cases, a highly skilled operator and a less skilled operator exist in a series of process steps.

In a case wherein work is not divided, one operator executes a plurality of processes. Even an operator who is highly skilled in a specific process may not have any high skill for work except the specific process.

That is, when the same work order contents are uniformly presented to all operators without considering each operator or work contents executed by the operator, the business efficiency may drop depending on the difference in skill and the difference in work in charge.

In this POD operation environment, demands also arise for a configuration to output a work order form which allows the operator to do work regardless of his skill.

For this purpose, the fourth embodiment premises the configurations described in the first to third embodiments, and gives a visual work order form which can be understood by any operator regardless of his skill in a case wherein a plurality of operators engage in a series of work steps. This work order form implements more advanced supports for the operator and high efficiency of all POD operations.

The basic configuration of a printing system according to the fourth embodiment complies with that according to the first embodiment. In the fourth embodiment, a print server 20 performs a process of creating a work order form. The fourth embodiment can also be applied to a case wherein a work order form is created in an MFP, as described in the first embodiment. The internal configuration of the print server 20 (FIG. 1) will be explained with reference to FIG. 19.

Figure 19:
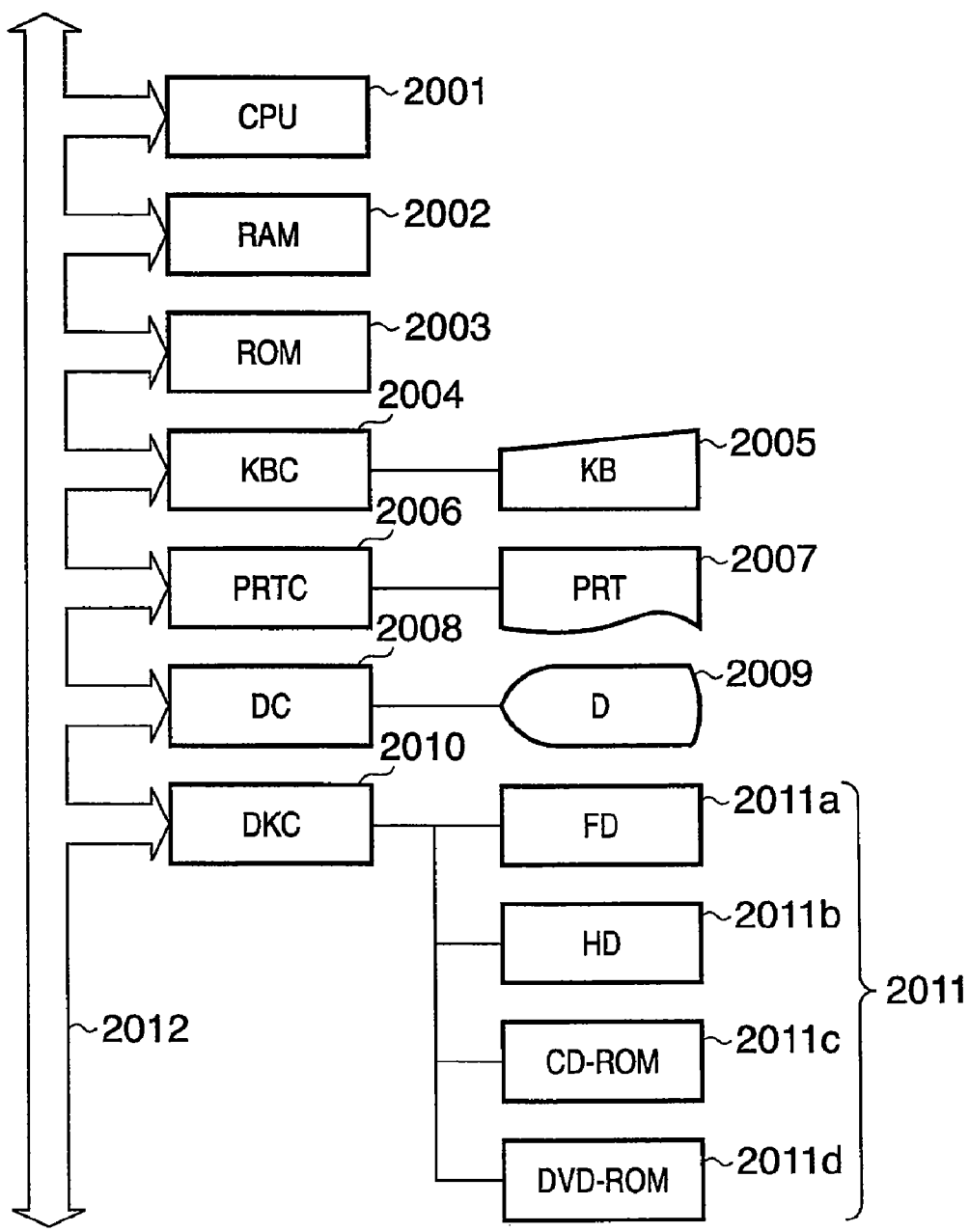
FIG. 19 is a block diagram showing the internal configuration of a print server according to the fourth embodiment of the present invention.

FIG. 19 is a block diagram showing the internal configuration of the print server according to the fourth embodiment of the present invention.

The configuration of the print server 20 can also be applied to each of embodiments described above or to be described later.

In FIG. 19, reference numeral 2001 denotes a CPU (Central Processing Unit) which controls the whole print server 20 and executes arithmetic processes. Reference numeral 2002 denotes a RAM (Random Access Memory) functioning as a work area or temporary save area where programs and data are loaded and executed for each process. Reference numeral 2003 denotes a ROM (Read Only Memory) serving as a memory area for a system control program, font data, and the like.

Reference numeral 2004 denotes a KBC (KeyBoard Controller) which receives data of a key input from a keyboard (KB) 2005 and transfers it to the CPU 2001. Reference numeral 2006 denotes a PRTC (PRinT Controller) which controls a printer (PRT) 2007. The printer 2007 is, e.g., an MFP 24, laser beam printer, or inkjet printer.

Reference numeral 2008 denotes a DC (Display Controller) which controls display on a display (D) 2009. The display 2009 is, e.g., a CRT or LCD. Reference numeral 2010 denotes a DKC (DisK Controller) which controls data transmission and the like with an external storage device 2011.

The external storage device 2011 includes an FD (Floppy®️ Disk) 2011*a*, HD (Hard Disk) 2011*b*, CD-ROM 2011*c*, and DVD-ROM 2011*d*. Programs and data are stored in the external storage device 2011, and referred to or loaded into the RAM 2002 in execution, as needed. Reference numeral 2012 denotes a system bus serving as data transfer path between various building components of the print server 20.

The print server 20 operates when the CPU 2001 executes a basic I/O (Input/Output) program, OS (Operating System), and a printing control program which implements various processes to be described later.

The basic I/O program is stored in, e.g., the ROM 2003, and the OS is stored in the HD 2011*b*. When the print server 20 is powered on, the OS is loaded from the HD 2011*b* into the RAM 2002 by an IPL (Initial Program Loading) function in the basic I/O program, and the OS starts running.

In the fourth embodiment, the printing control program and related data are stored in the FD 2011*a*, CD-ROM 2011*c*, and DVD-ROM 2011*d* of the external storage device 2011. The printing control program and related data can be installed in the HD 2011*b*. In this case, the printing control program and related data are read out from the FD 2011*a*, CD-ROM 2011*c*, and DVD-ROM 2011*d*, installed in the HD 2011*b*, and can run under the control of the OS and basic I/O program.

The memory map of the HD 2011*b* after the printing control program and related data are installed is made up of, e.g., the basic I/O program, OS, printing control program, related data, and work area.

The procedures of the overall printing control process according to the fourth embodiment in the printing system having the above configuration will be explained.

A work order form generation process by the printing system according to the fourth embodiment will be explained with reference to FIG. 20.

Figure 20:
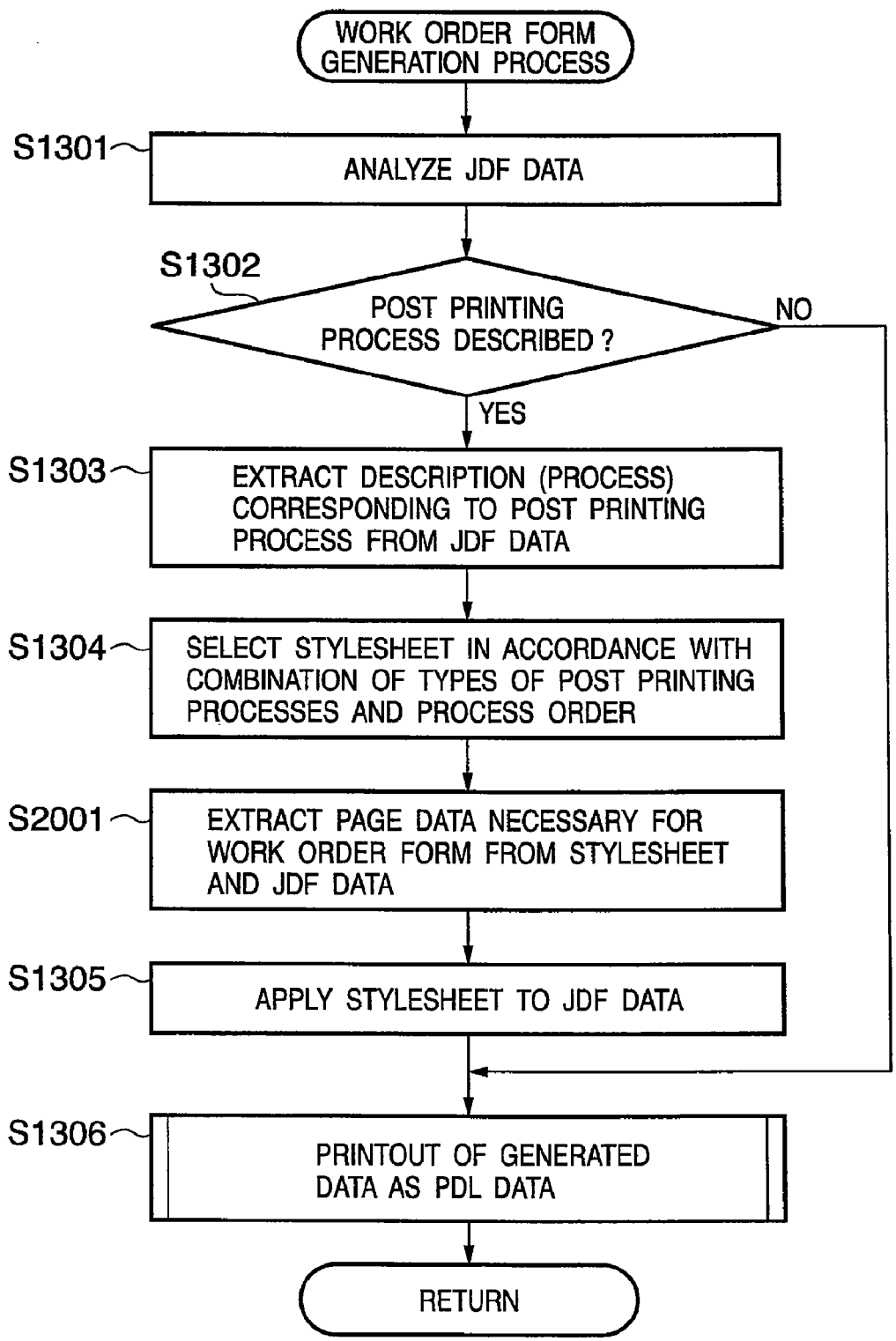
FIG. 20 is a flowchart showing a work order form generation process by a printing system according to the fourth embodiment of the present invention.

FIG. 20 is a flowchart showing the work order form generation process by the printing system according to the fourth embodiment of the present invention.

In FIG. 20, the same step numbers as those in the flowchart of FIG. 9 according to the first embodiment denote the same processes, and a detailed description thereof will be omitted.

After processes in steps S1301 to S1304, page data to be applied to a selected stylesheet is extracted from PDL data in step S2001. The page data is used as a thumbnail image to be composited in a predetermined area of the stylesheet. If necessary, scaling and rotation processes are executed for the page data.

In step S1305, the stylesheet containing the page data created in step S2001 is applied to JDF data. In step S1306, the generated data is rendered as work order form data formed from PDL data, and printed out to generate a work order form.

An application of JDF data to the stylesheet will be explained in detail.

Figure 21A:
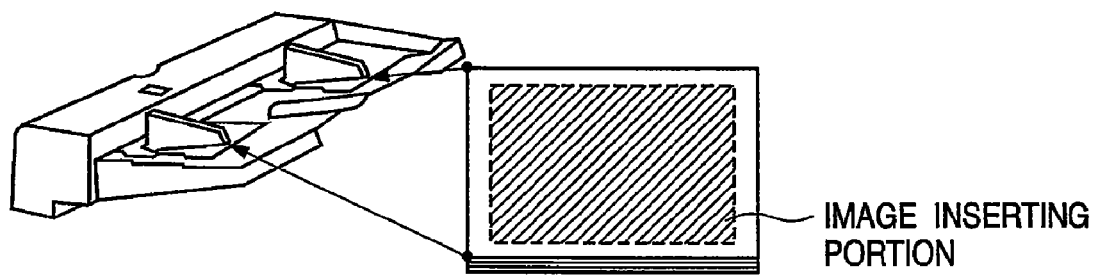
FIGS. 21A and 21B are views showing examples of image data which are stored for visualization in a stylesheet according to the fourth embodiment of the present invention.
Figure 21B:
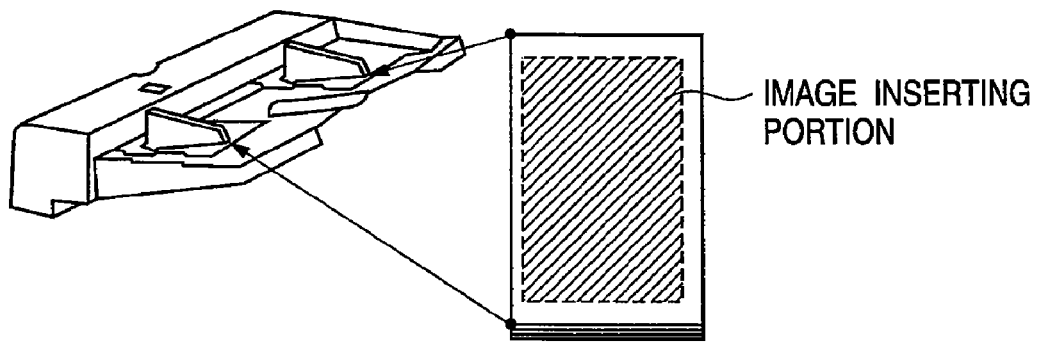

FIGS. 21A and 21B are views showing examples of image data which are stored for visualization in the stylesheet according to the fourth embodiment of the present invention.

The fourth embodiment prepares actual finisher image data, and line art data representing a finisher (post processing apparatus information on a post processing apparatus (finisher)), so as to composite these data in a predetermined area of the stylesheet. Further, the fourth embodiment provides a range (image inserting portion) for outputting an actual image (page data) which can be visually checked by the operator when he performs a post printing process.

For example, FIG. 21A is a view showing a state in which a printed product is loaded from its short side into the sheet feed port of a saddle stitching machine serving as a finisher. FIG. 21B is a view showing a state in which a printed product is loaded from its long side into the sheet feed port of the saddle stitching machine serving as a finisher.

At the image inserting portion, the operator actually inserts, as a thumbnail, an image identical to a predetermined page (e.g., first page) of a printed product output from an MFP. The operator can intuitively know the setting orientation and the obverse or reverse.

Note that the post processing apparatus information may be stored in, e.g., a stylesheet storing unit 1030 or in the print server 20 in advance. An order form generation unit 1103 can also properly acquire necessary post processing apparatus information from a storage destination where the post processing apparatus information is stored.

Figure 22:
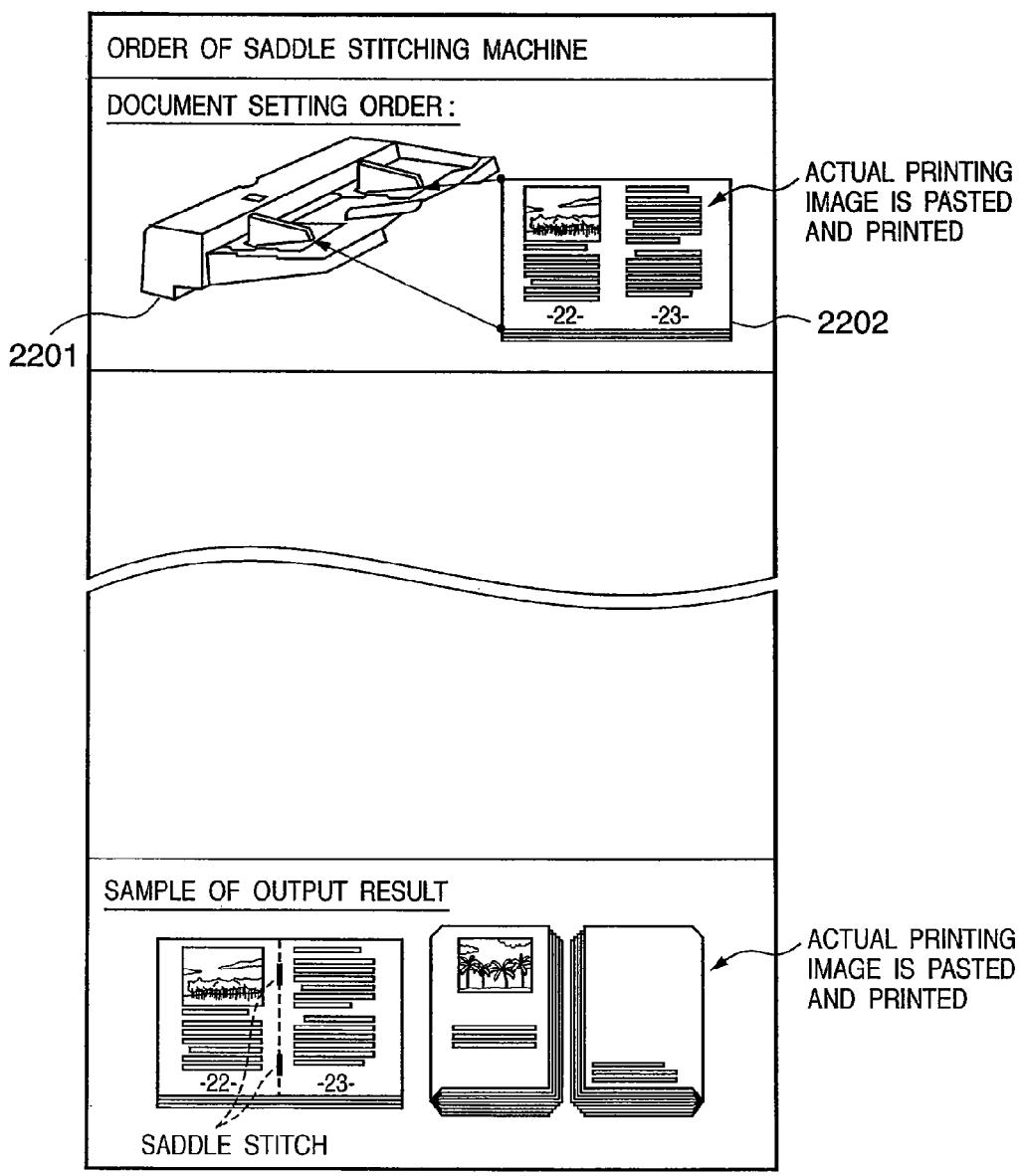
FIG. 22 is a view showing a concrete example of a work order form generated by applying a stylesheet to JDF data according to the fourth embodiment of the present invention.

FIG. 22 is a view showing a concrete example of a work order form generated by applying a stylesheet to JDF data according to the fourth embodiment of the present invention.

FIG. 22 shows a work order form using the above-mentioned image data while applying the stylesheet in FIG. 11 to the JDF data in FIG. 10. It is understood that the work order form is formed from visual data which is a combination of a finisher image 2201 and printed image data 2202. For example, the order contents are more friendly to the operator than the work order form in FIG. 13.

The visual data formed from a combination of the finisher image and printed image data also visualizes a process in performing a post printing process by the finisher, and the output result of the process. Also in this case, actual page data is inserted as a thumbnail image.

For example, an image is rendered at a cover position using cover data contained in actual PDL data, and the rendered image is composited at a predetermined cover image insertion position. That is, the visual data shows, in an easy-to-understand manner, the layout of a finally printed product as a result of executing all post printing processes. The operator can easily determine whether or not the finally printed product has any error.

Processes such as the printout process by the MFP, the stylesheet registration process, and the stylesheet selection process are identical to those in the first embodiment, and a description thereof will be omitted.

As described above, according to the fourth embodiment, the printing system can be efficiently operated and maintained by generating a post printing process work order form which visualizes a post printing process specified by JDF data and information on the post processing apparatus. Consequently, the burden of system maintenance in rearranging or replacing offline finisher devices can be reduced.

By visualizing even an output result in a post printing process, it can be determined whether the work is correct.

Fifth Embodiment

The fifth embodiment will explain a configuration to generate a work order form which especially visualizes operation unit information on the operation unit of a finisher, in addition to a finisher image in the fourth embodiment, when a work order form for the printing system is generated.

A work order form generation process by the printing system according to the fifth embodiment will be explained with reference to FIG. 23.

Figure 23:
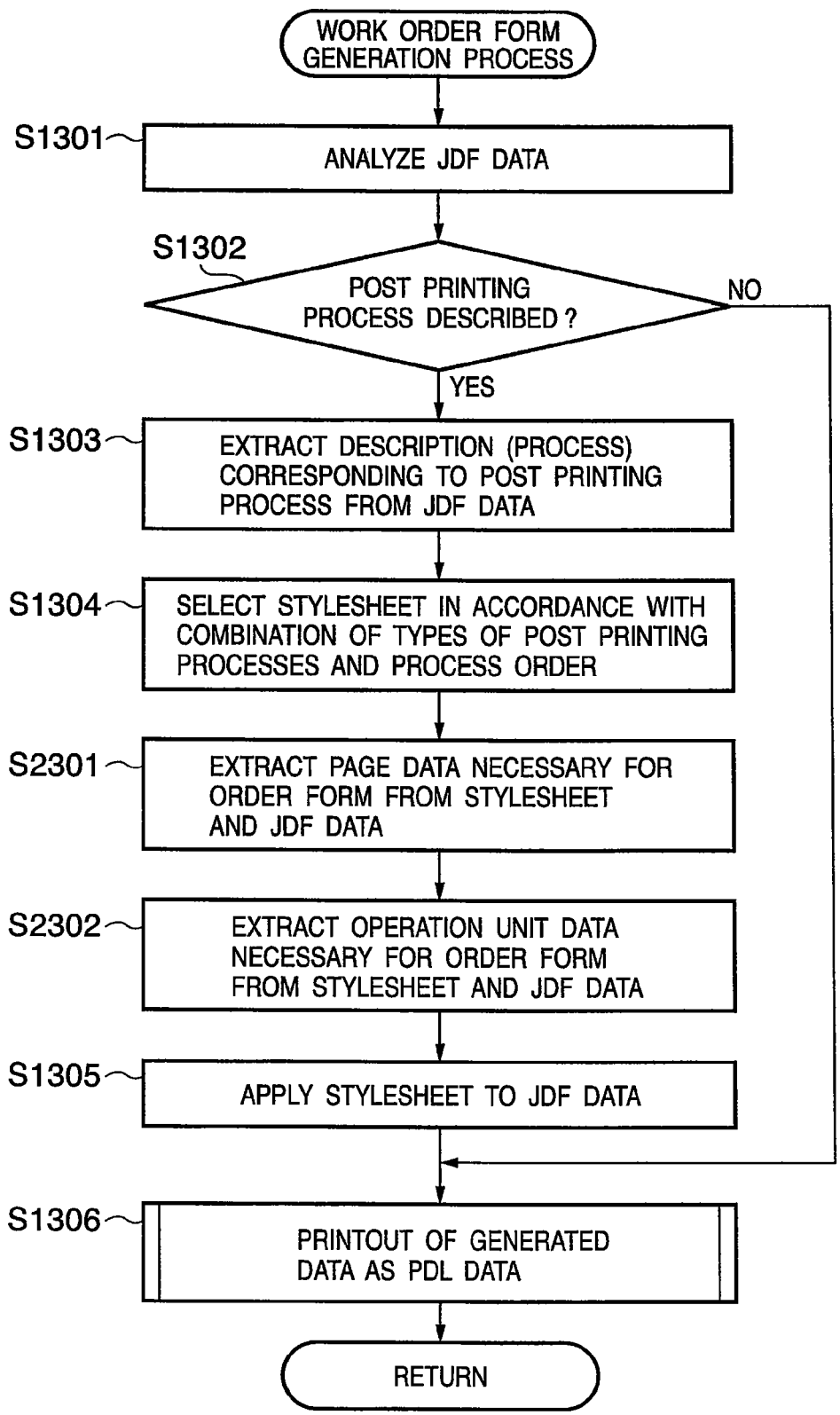
FIG. 23 is a flowchart showing a work order form generation process by a printing system according to the fifth embodiment of the present invention.

FIG. 23 is a flowchart showing the work order form generation process by the printing system according to the fifth embodiment of the present invention.

In FIG. 23, the same step numbers as those in the flowchart of FIG. 9 according to the first embodiment denote the same processes, and a detailed description thereof will be omitted.

After processes in steps S1301 to S1304, the same process as that of step S2001 according to the fourth embodiment is executed in step S2301. In step S2302, prepared image data of the operation unit of a finisher is extracted.

In step S1305, the stylesheet containing the visual data created in steps S2301 and S2302 is applied to JDF data. In step S1306, the generated data is rendered as work order form data formed from PDL data, and printed out to generate a work order form.

An application of JDF data to the stylesheet will be explained in detail.

Figure 24:
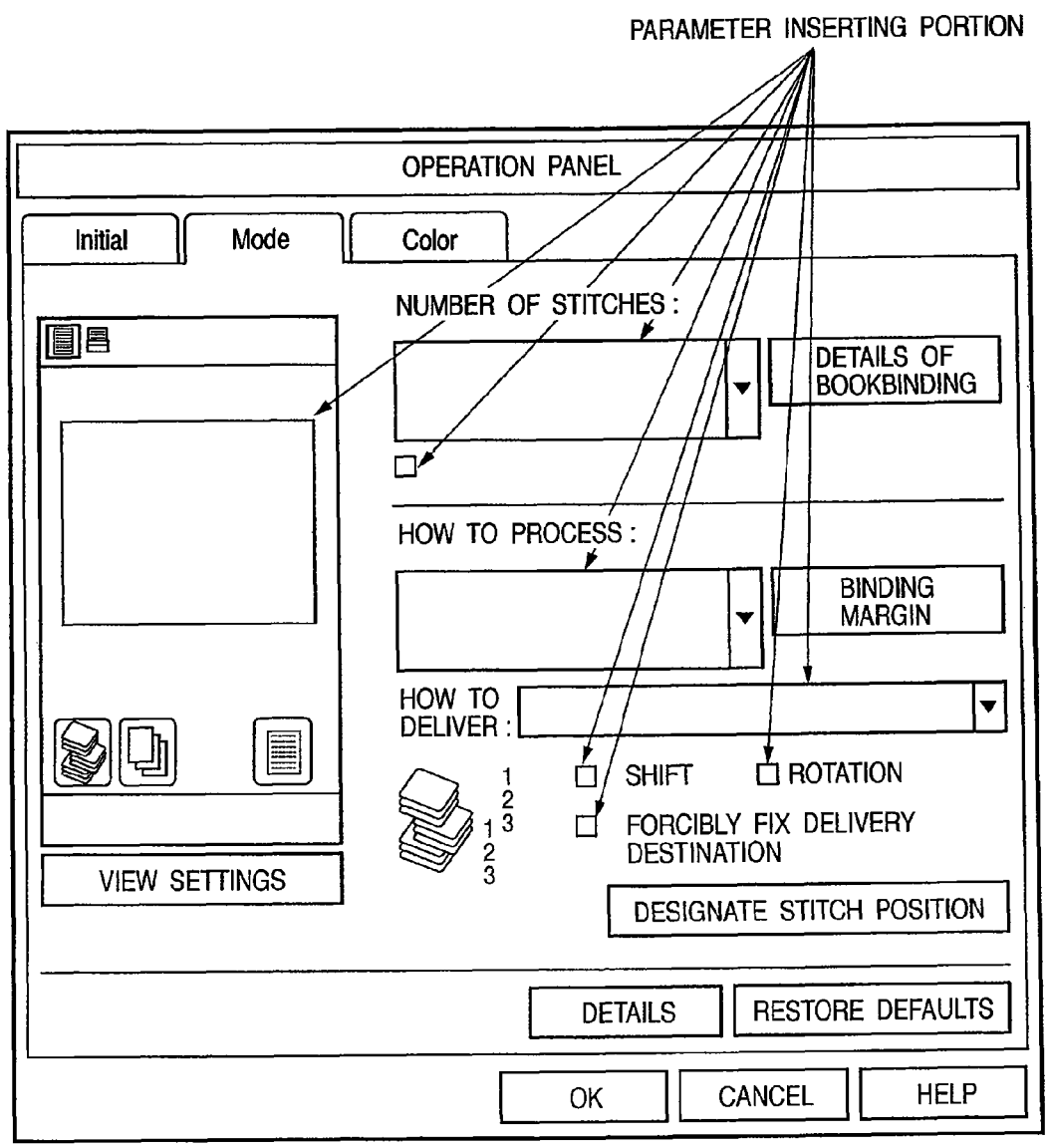
FIG. 24 is a view showing an example of image data which is stored for visualization in a stylesheet according to the fifth embodiment of the present invention.

FIG. 24 is a view showing an example of image data which is stored for visualization in the stylesheet according to the fifth embodiment of the present invention.

Image data of the operation unit of a finisher has a range to output, on the basis of an actual finisher operation unit image (operation unit information on the operation unit of a post processing apparatus (finisher)), actual parameter setting values which can be seen when a post printing process is done. FIG. 24 shows, as a finisher operation unit image, an image containing various parameter inserting portions at which input of parameter setting values settable on the operation panel is accepted.

Note that the operation unit information may be stored in, e.g., a stylesheet storing unit 1030 or in a print server 20 in advance. An order form generation unit 1103 can also properly acquire necessary operation unit information from a storage destination where the operation unit information is stored.

Figure 25:
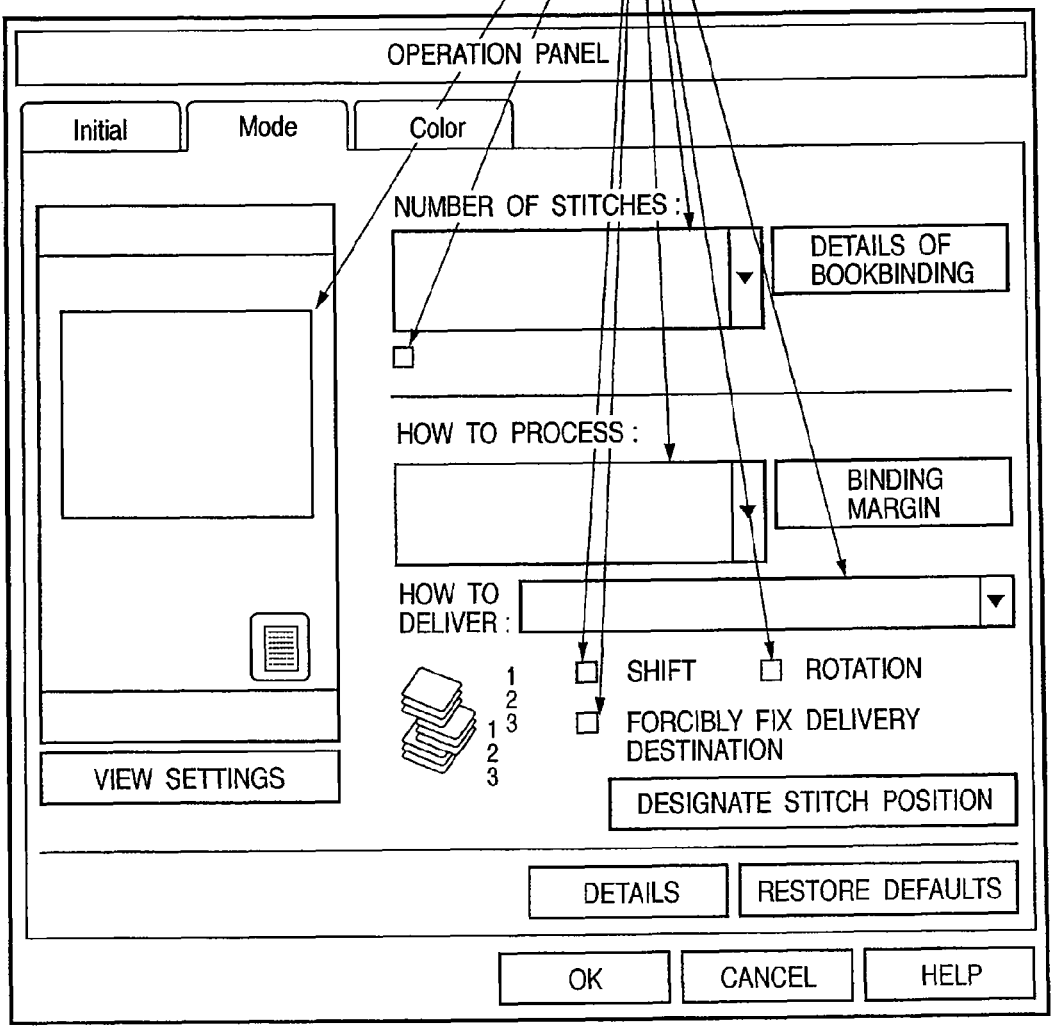
FIG. 25 is a schematic view showing an application of parameter setting values according to the fifth embodiment of the present invention.

FIG. 25 is a schematic view showing an application of parameter setting values according to the fifth embodiment of the present invention.

In FIG. 25, the contents of a description 1012 are extracted as parameter setting values from JDF data in FIG. 10, and applied to the finisher operation unit image in FIG. 24.

Figure 26:
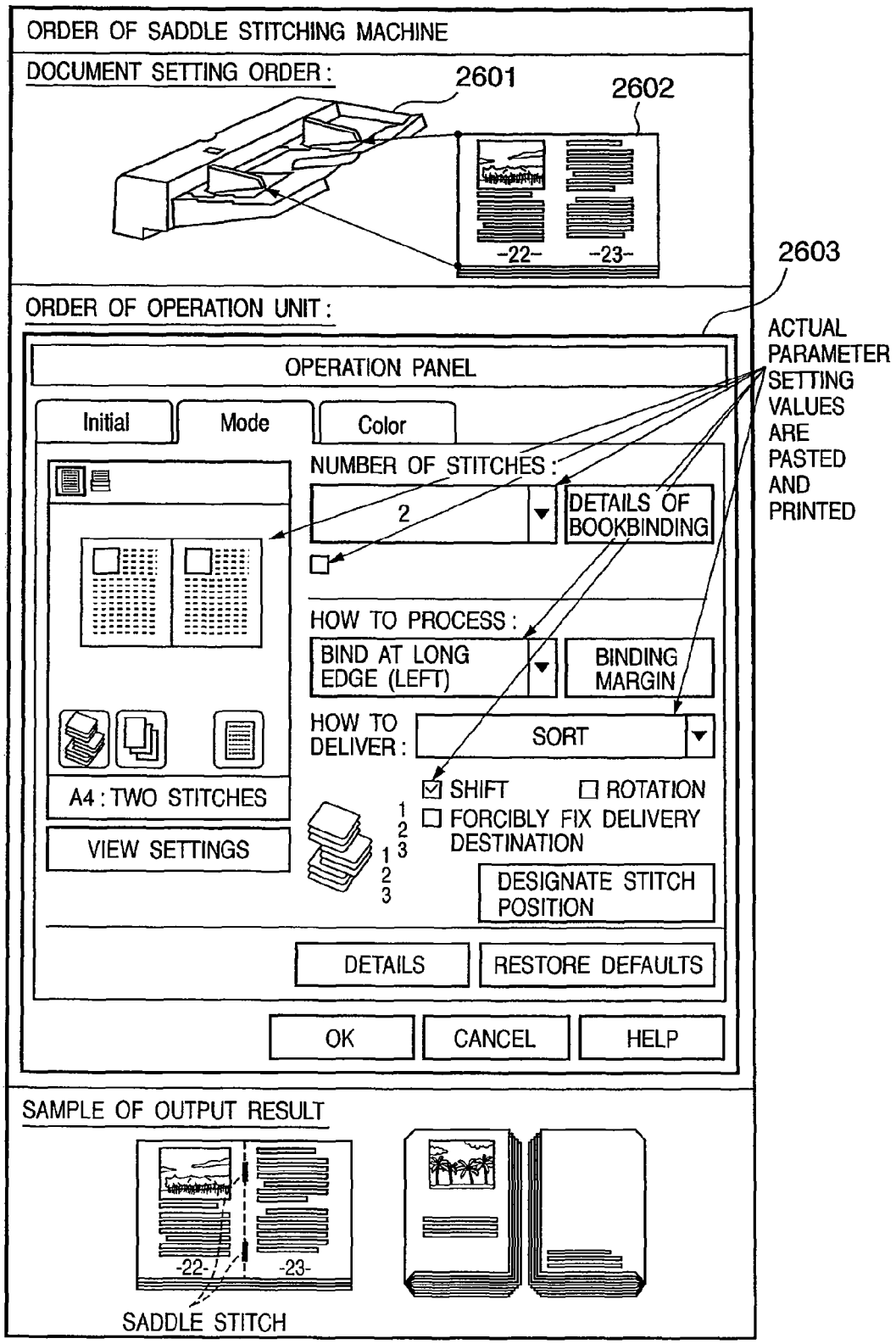
FIG. 26 is a view showing a concrete example of a work order form generated by applying a stylesheet to JDF data according to the fifth embodiment of the present invention.

FIG. 26 is a view showing a concrete example of a work order form generated by applying a stylesheet to JDF data according to the fifth embodiment of the present invention.

FIG. 26 shows a work order form which is printed out after the stylesheet in FIG. 11 is applied to the JDF data in FIG. 10. It is understood that the work order form is formed from visual data which is a combination of a finisher image 2601, printed image data 2602, and a finisher operation unit image 2603 containing parameter setting values.

As described above, according to the fifth embodiment, in addition to the effects described in the fourth embodiment, a post printing process work order form which visualizes a post printing process specified by JDF data and information on the post processing apparatus and operation unit is generated. With this work order form, the printing system can be operated and maintained more efficiently.

Sixth Embodiment

The fourth and fifth embodiments have described a printing system which outputs a work order form that allows the operator to do work regardless of his skill. However, depending on the operation environment, it is also an important factor to individually present a work order form corresponding to the skill and work contents of each operator.

From this, the sixth embodiment premises the configurations described in the first to fifth embodiments, and gives an appropriate work order form in accordance with the skill and work contents of each operator in a case wherein a plurality of operators engage in a series of work steps. This work order form implements more advanced supports for the operator and high efficiency of all POD operations.

A work order form generation process by the printing system according to the sixth embodiment will be explained with reference to FIG. 27.

Figure 27:
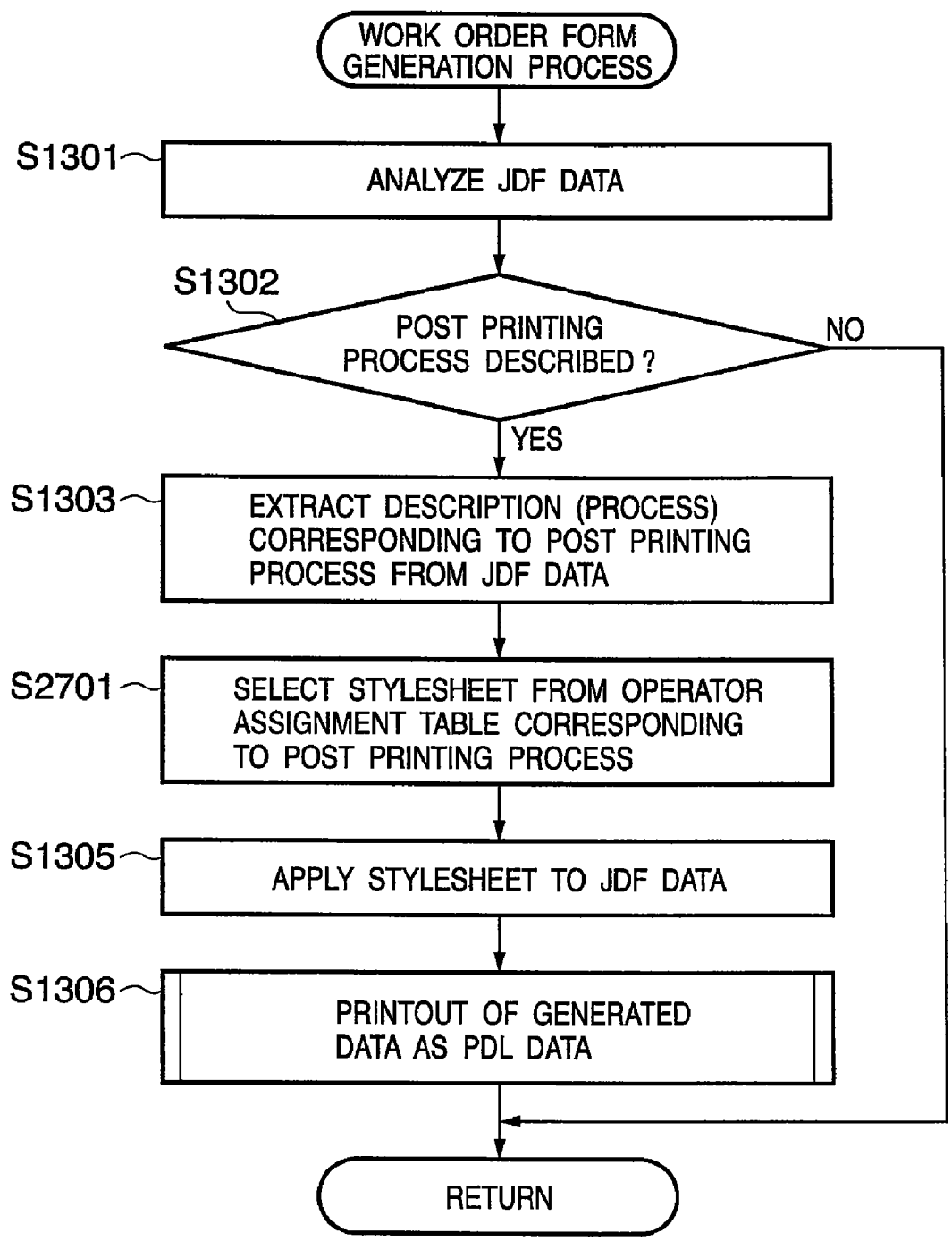
FIG. 27 is a flowchart showing a work order form generation process by a printing system according to the sixth embodiment of the present invention.

FIG. 27 is a flowchart showing the work order form generation process by the printing system according to the sixth embodiment of the present invention.

In FIG. 27, the same step numbers as those in the flowchart of FIG. 9 according to the first embodiment denote the same processes, and a detailed description thereof will be omitted.

After processes in steps S1301 to S1303, a stylesheet is selected in step S2701 by looking up an operator assignment table corresponding to post printing processes. In step S1305, the stylesheet is applied to JDF data. In step S1306, the generated data is rendered as work order form data formed from PDL data, and printed out to generate a work order form.

Assignment of operators will be explained.

Figures 28A, 28B:
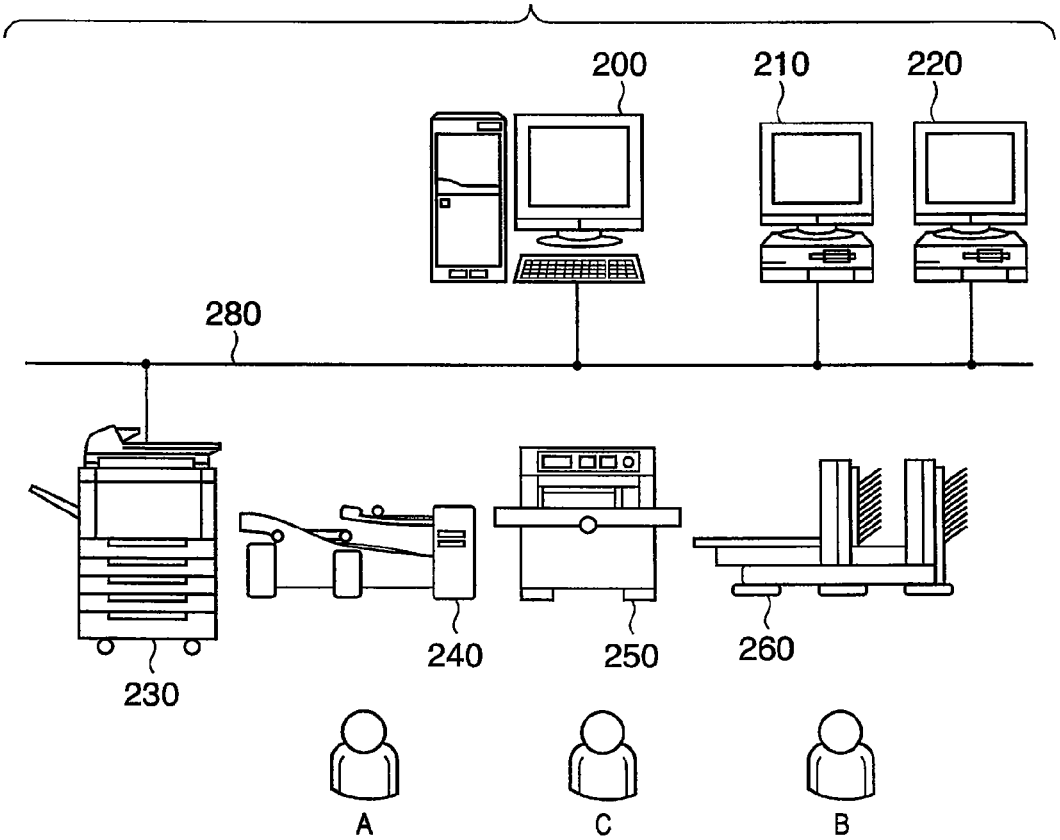
FIGS. 28A and 28B are views for explaining assignment of operators according to the sixth embodiment of the present invention.

FIGS. 28A and 28B are views for explaining assignment of operators according to the sixth embodiment of the present invention.

FIG. 28A shows the assignment status of operators to post printing processes. In FIG. 28A, (1) operator A is assigned as a person in charge of the folding process (folding machine 240), (2) operator C is assigned as a person in charge of the cutting process (cutting machine 250), and (3) operator B is assigned as a person in charge of the stitching process (saddle stitching machine 260). The operator assignment status is managed by an operator assignment table shown in FIG. 28B.

Selection of the stylesheet will be explained with reference to FIG. 29.

Figure 29:
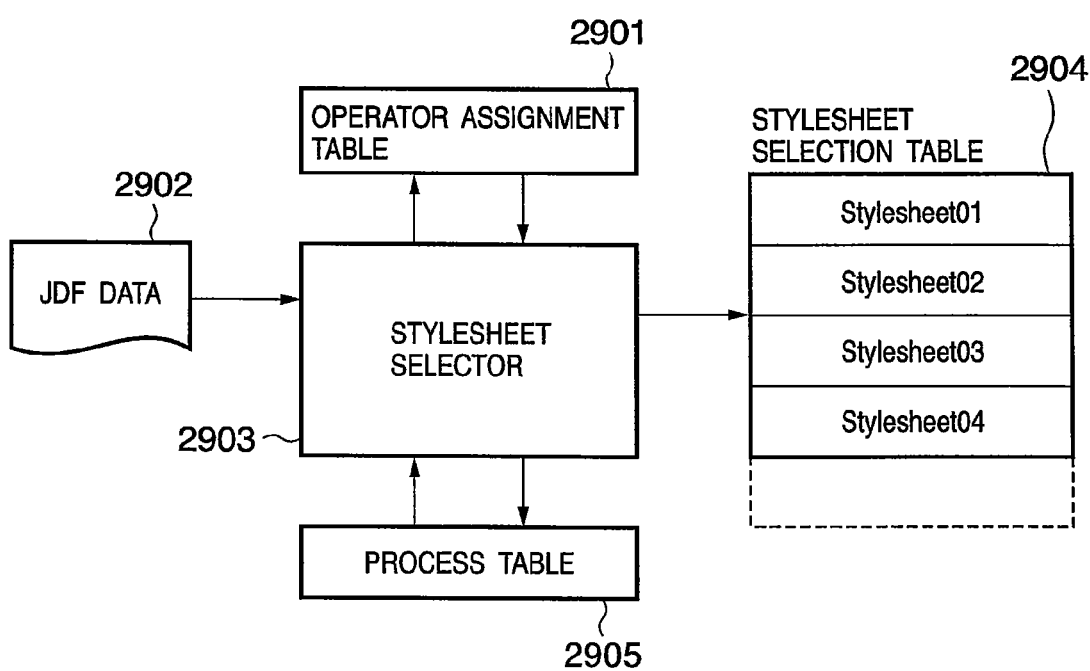
FIG. 29 is a block diagram for explaining selection of the stylesheet according to the sixth embodiment of the present invention.

FIG. 29 is a block diagram for explaining selection of the stylesheet according to the sixth embodiment of the present invention.

An MFP stylesheet selector 2903 is implemented in, e.g., an order form generation unit 1103 (FIG. 8), and has a process table 2905 which manages a combination of post printing processes in accordance with processes described in JDF data 2902 to be processed. A corresponding stylesheet is selected from a stylesheet selection table 2904 on the basis of an operator assignment table 2901. For example, Stylesheet 03 is selected for the JDF data in FIG. 10 and the operator assignment table in FIG. 28B.

Various building components shown in FIG. 29 may be configured in a print server 20.

A concrete example of the work order form will be explained with reference to FIG. 30.

FIG. 30 is a view showing a concrete example of the work order form generated by applying a stylesheet to JDF data according to the sixth embodiment of the present invention.

FIG. 30 shows a work order form which is printed out on the basis of the JDF data in FIG. 10, the stylesheet in FIG. 11, and the operator assignment table in FIG. 28B. FIG. 30 shows that a work order form is generated for each operator. In particular, the contents of a process of which the operator is in charge are printed in each work order form so that the process can be discriminated from another one.

An operator assignment process of setting an operator assignment table for post printing processes in a printer server or MFP will be explained with reference to FIG. 31.

Figure 31:
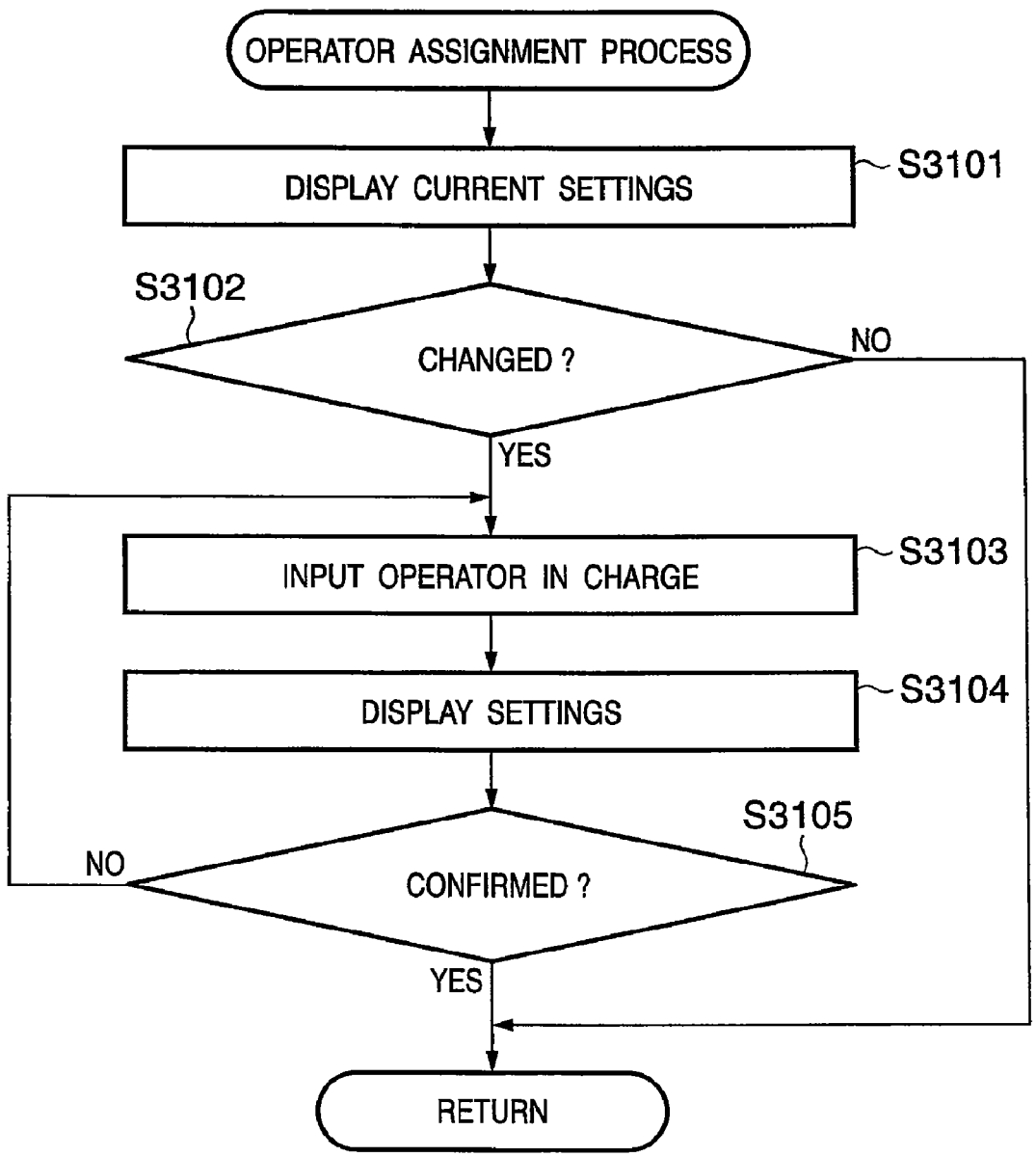
FIG. 31 is a flowchart showing an operator assignment process according to the sixth embodiment of the present invention.

FIG. 31 is a flowchart showing the operator assignment process according to the sixth embodiment of the present invention.

In step S3101, the current assignment state of operators to finishers used in post printing processes is displayed. This is implemented by looking up the current operator assignment table. In step S3102, it is determined whether a change instruction has been input. If no change instruction has been input (NO in step S3102), the process ends; if a change instruction has been input (YES in step S3102), the flow advances to step S3103.

In step S3103, operator information on an operator in charge is input via the assignment setting window (not shown) of each finisher. In step S3104, the contents of the operator assignment table are temporarily updated on the basis of the input operator information, and the operator assignment state is displayed on the basis of the updated contents.

In step S3105, it is determined whether an instruction to finalize the operator assignment state has been input. That is, the operator is prompted to confirm the contents of the operator assignment state. If no finalization instruction has been input (NO in step S3105), the flow returns to step S3103; if a finalization instruction has been input (YES in step S3105), the contents of the operator assignment table are finalized.

As described above, according to the sixth embodiment, the printing system can be efficiently operated and maintained by generating a work order form suited to each operator on the basis of JDF data and operator information of the operator assignment table.

Note that the format of the stylesheet is not limited to one in FIG. 30. In the sixth embodiment, a work order form which clearly specifies the contents of a process by each operator is created on the basis of the type of post process that is described in JDF data, and information on an operator who executes the post process.

Seventh Embodiment

The seventh embodiment will describe a configuration in which, when a work order form is generated in a printing system, it is generated in accordance with especially information on an operator in charge of a post printing process, and the skill of the operator.

An operator skill table according to the seventh embodiment will be explained with reference to FIG. 32.

FIG. 32 is a table showing an example of the operator skill table according to the seventh embodiment of the present invention.

The operator skill table manages the structure of the operator management table according to the sixth embodiment, and in addition the skill (level of proficiency) of each operator at a finisher used in a post printing process. The skill is expressed by "High" or "Low", and "High" represents a higher skill than that represented by "Low".

Selection of the stylesheet will be explained with reference to FIG. 33.

Figure 33:
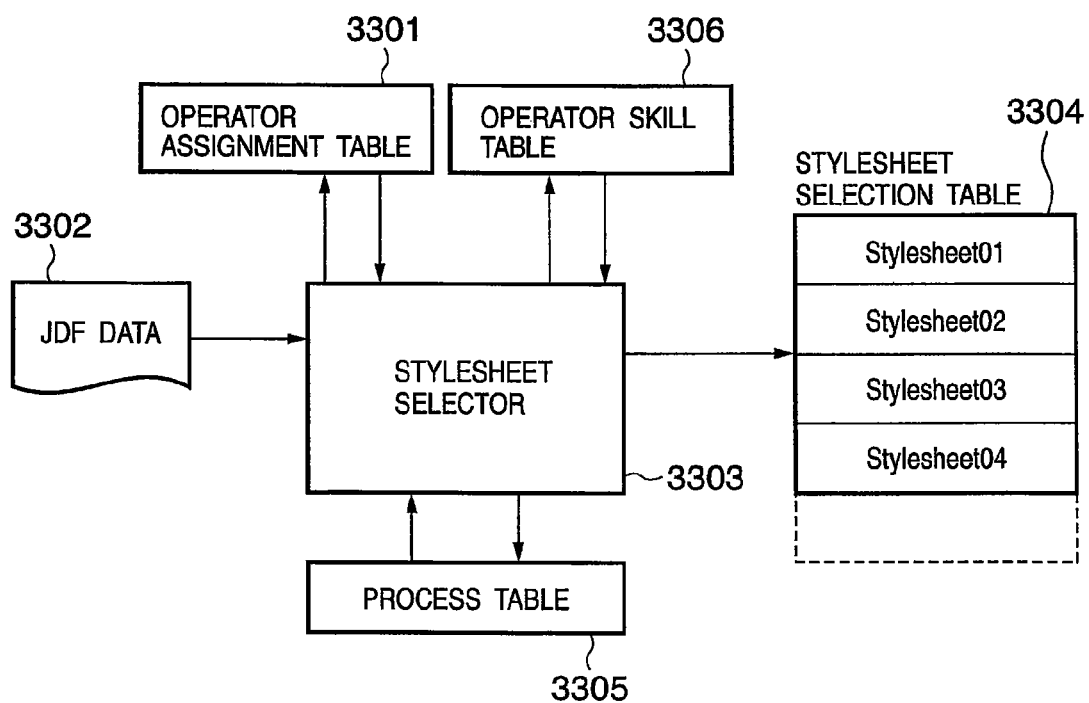
FIG. 33 is a block diagram for explaining selection of the stylesheet according to the seventh embodiment of the present invention.

FIG. 33 is a block diagram for explaining selection of the stylesheet according to the seventh embodiment of the present invention.

An MFP stylesheet selector 3303 is implemented in, e.g., an order form generation unit 1103 (FIG. 8). The stylesheet selector 3303 selects, based on processes described in JDF data 3302 to be processed, a corresponding stylesheet from a stylesheet selection table 3304 on the basis of a process table 3305 which manages a combination of post printing processes, an operator assignment table 3301, and an operator skill table 3306. For example, Stylesheet 03 is selected for the JDF data in FIG. 10, the operator assignment table in FIG. 28B, and the operator skill table in FIG. 32.

Especially, the stylesheet selector 3303 according to the seventh embodiment operates to preferentially select an operator whose skill at each finisher is "High". When the skills of operators are equal, the stylesheet selector 3303 operates to preferentially select an unselected operator. For example, in the operator skill table of FIG. 32, operator A is selected for the folding machine; operator B, for the saddle stitching machine; and operator C, for the cutting machine.

Various building components shown in FIG. 33 may be configured in a print server 20. The operator assignment table and operator skill table may be expressed as one operator management table which manages these pieces of operator information.

A concrete example of the work order form will be explained with reference to FIG. 34.

FIG. 34 is a view showing a concrete example of the work order form generated by applying a stylesheet to JDF data according to the seventh embodiment of the present invention.

FIG. 34 shows a work order form which is printed out on the basis of the JDF data in FIG. 10, the stylesheet in FIG. 11, the operator assignment table in FIG. 28B, and the operator skill table in FIG. 32. It turns out from FIG. 34 that a work order form is generated for each operator. In this case, operator C has a skill "LOW", i.e., his proficiency at a process is low, so operation support information 3401 for supporting the operation is printed.

An operator skill setting process of setting an operator skill table in a print server or MFP will be explained with reference to FIG. 35.

Figure 35:
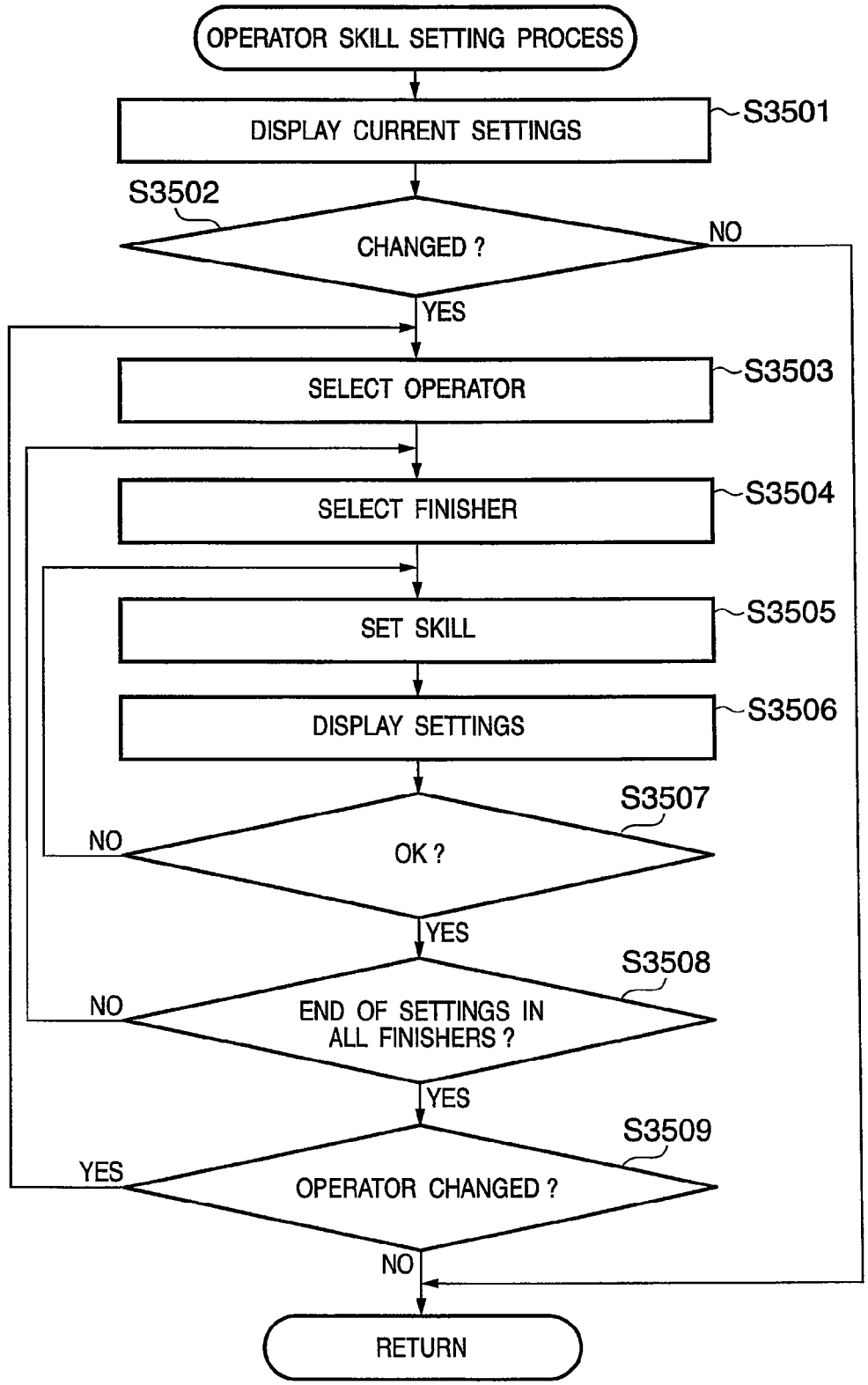
FIG. 35 is a flowchart showing an operator skill setting process according to the seventh embodiment of the present invention.

FIG. 35 is a flowchart showing the operator skill setting process according to the seventh embodiment of the present invention.

In step S3501, the current setting state of operator skills at finishers used in post printing processes is displayed. This is implemented by looking up the current operator skill table. In step S3502, it is determined whether a change instruction has been input. If no change instruction has been input (NO in step S3502), the process ends; if a change instruction has been input (YES in step S3502), the flow advances to step S3503.

In step S3503, operator information on an operator whose skill needs to be changed is selected. In step S3504, finisher information representing a finisher which needs to be changed is selected. In step S3505, skill information representing a skill is set. In step S3506, the contents of the operator skill table are temporarily updated on the basis of the input operator information, finisher information, and skill information, and the operator assignment state is displayed on the basis of the updated contents.

In step S3507, it is determined whether an instruction to finalize the operator skill setting state has been input. That is, the operator is prompted to confirm the contents of the operator skill setting state. If no finalization instruction has been input (NO in step S3507), the flow returns to step S3505; if a finalization instruction has been input (YES in step S3507), the contents of the operator skill table are finalized.

In step S3508, it is determined whether all settings of an operator to a selected finisher have ended. If all settings have not ended (NO in step S3508), the flow returns to step S3504 to select a finisher which needs to be changed, and repeat the process. If all settings have ended (YES in step S3508), the flow advances to step S3509.

In step S3509, it is determined whether an instruction to change the skill of another operator has been input. If the change instruction has been input (YES in step S3509), the flow returns to step S3503 to select an operator and repeat the process; if no change instruction has been input (NO in step S3509), the process ends.

As described above, according to the seventh embodiment, in addition to the effects described in the sixth embodiment, the printing system can be efficiently operated and maintained by generating a work order form suited to each operator and his skill on the basis of skill information of the operator. As operation support information, image data described in the fourth and fifth embodiments may also be displayed.

Since the skill of each operator who is likely to operate a finisher can be managed in rearranging or replacing the finisher, the burden of system maintenance can be reduced.

Eighth Embodiment

The first to seventh embodiments have mainly described a configuration to control the contents of a work order form. The eighth embodiment will explain a configuration to select an optimal stylesheet to be applied to JDF data when a work order form is generated.

The configuration to be described in the eighth embodiment is effective when there are a plurality of types of finishers for each model and there are a plurality of types of stylesheets for selecting, from the finishers, a combination of finishers used in post printing processes.

The basic configuration of a printing system according to the eighth embodiment complies with that according to the first embodiment, and a description of the detailed configurations of an MFP and print server will be omitted.

A stylesheet selection process of selecting a stylesheet will be explained with reference to FIG. 36.

Figure 36:
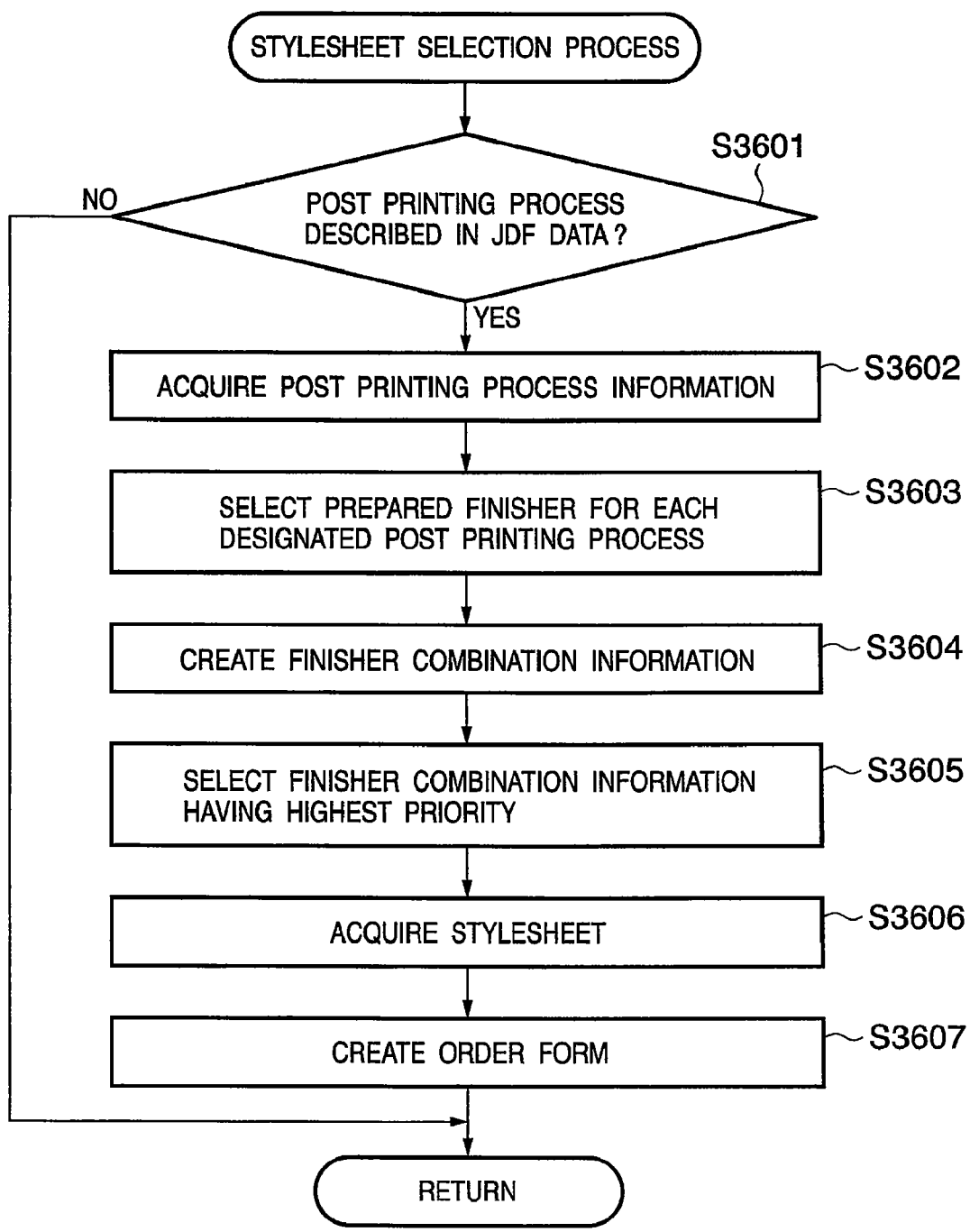
FIG. 36 is a flowchart showing the stylesheet selection process according to the eighth embodiment of the present invention.

FIG. 36 is a flowchart showing the stylesheet selection process according to the eighth embodiment of the present invention.

In step S3601, it is determined from JDF data whether a post printing process is described. If no post printing process is described (NO in step S3601), the process ends; if a post printing process is described (YES in step S3601), the flow advances to step S3602.

In step S3602, post printing process information on the number of post printing processes, their types, their settings, and the like is acquired from JDF data. The number of post printing processes represents how many types of post printing processes are required.

The types of post printing processes and their settings are shown in, e.g., FIG. 37. The type of post printing process is that of necessary post printing process, and FIG. 37 shows post printing processes by the folding machine, cutting machine, saddle stitching machine, and case binding machine. As the setting of, e.g., the folding machine, setting items (half fold, short fold, 8-page parallel fold, Z fold, 8-page accordion fold, double fold, and the like) prepared in each finisher are presented as folding methods prepared in the folding machine.

In step S3603, a finisher which satisfies the set condition of each post printing process is extracted. A finisher information table in which the types of prepared finishers and setting items are managed as finisher information, as shown in FIG. 38, is managed in, e.g., the MFP in advance. A finisher which meets settings in JDF data is selected from the finisher information table.

In the finisher information table of FIG. 38, the storing order of finishers in each finisher setting item is the priority order of finishers used in a post printing process at the setting item. The priority order is not limited to that of finishers used in a post printing process at each setting item. For example, the priority order of finishers for each type, or the priority order of finisher information set by the operator may be managed together in the finisher information table.

In step S3604, combination information is created in which all combinations of finishers that satisfy set post printing processes are selected from selected finishers in accordance with a combination of set post printing processes.

In step S3605, a combination having the highest priority is selected from the created finisher combination information. For example, in FIG. 38, the priority order is determined for each setting item of each finisher, i.e., each post printing process. A combination having the highest priority, is determined on the basis of the sum of all priorities used in combinations selected from the combination information.

In step S3606, a stylesheet which is created and held for the finally selected combination information is acquired. The stylesheet is managed by the stylesheet selection table for each setting item of each finisher or each combination of setting items.

Figure 40:
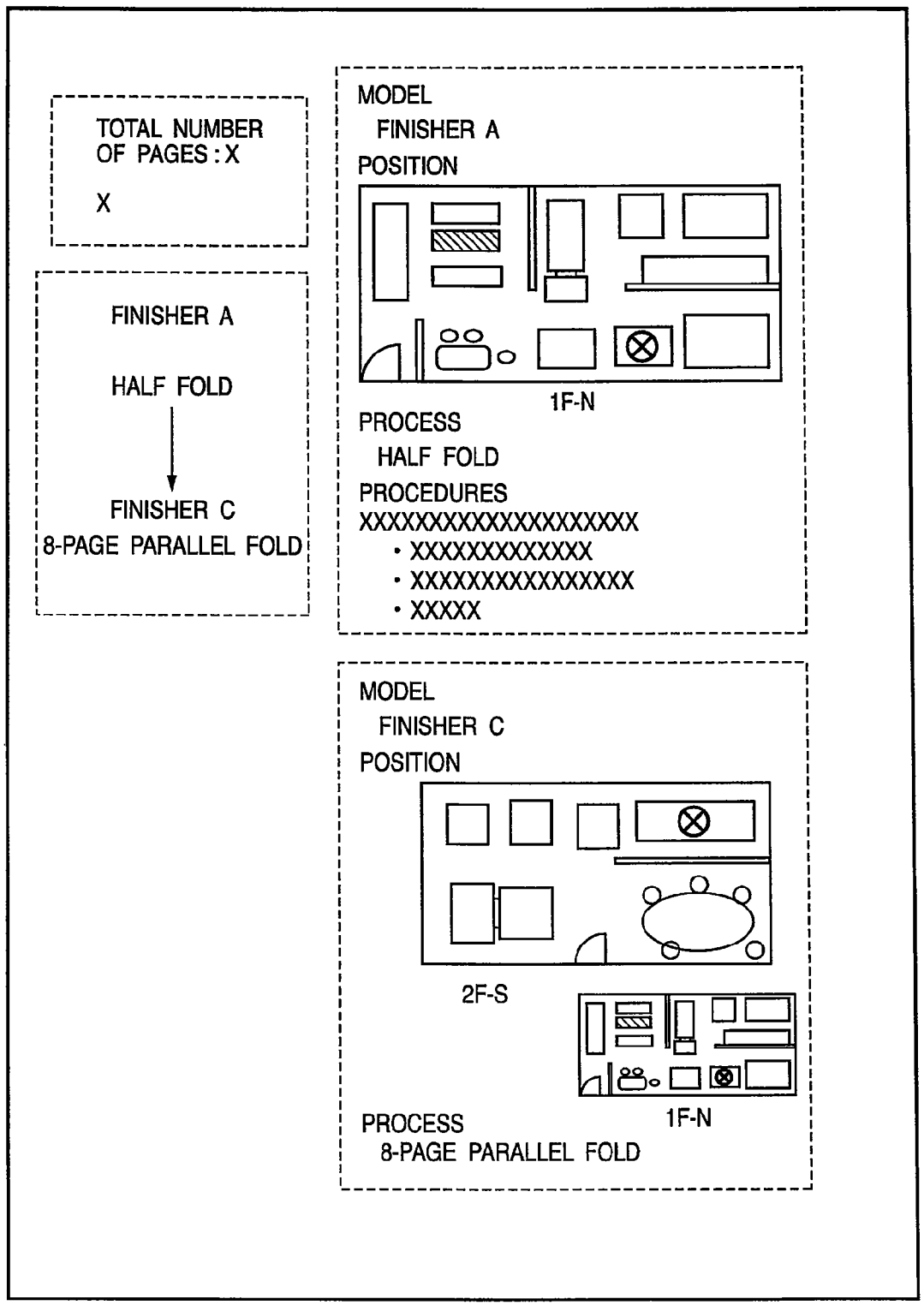
FIG. 40 is a view showing another concrete example of the work order form generated by applying a stylesheet to JDF data according to the eighth embodiment of the present invention.

In step S3607, work order form data is generated by applying the acquired stylesheet to JDF data. FIG. 39 shows an example of a work order form generated from a stylesheet prepared for each setting of each finisher. FIG. 40 shows an example of a work order form generated from a stylesheet in which a plurality of post printing processes are combined.

In FIG. 39, it turns out by looking up the finisher information table that finisher A is used at the highest priority for "half fold" and "short fold". Thus, a stylesheet corresponding to finisher A is selected to generate a work order form. As for "8-page parallel fold", it turns out by looking up the finisher information table that finisher C is used at the highest priority. Thus, a stylesheet corresponding to finisher C is selected to generate a work order form.

In FIG. 40, it turns out by looking up the finisher information table that finishers A and C are used at the high priority for a combination of "half fold" and "short fold". Thus, stylesheets corresponding to finishers A and C are selected to generate a work order form.

As described above, according to the eighth embodiment, a finisher information table which manages finishers in an optimal order when finishers available for the same post printing process are utilized, and stylesheets corresponding to the finishers are managed. A stylesheet for using a finisher optimal for a target post printing process can be selected to generate a work order form on the basis of the stylesheet.

As a result, a more optimal work order form can be provided for each post printing process, and supports for the operator and high efficiency of all POD operations in the current POD operation environment can be achieved.

Ninth Embodiment

The eighth embodiment has described a configuration in which available finishers are managed in the priority order for each setting item of each finisher, and a final stylesheet is selected on the basis of the priority order. To the contrary, the ninth embodiment will explain a configuration in which stylesheets for defining a combination of available finishers are managed for a combination of post printing processes, and a final stylesheet is selected on the basis of the combination.

The ninth embodiment will describe this configuration.

A stylesheet selection process of selecting a stylesheet will be explained with reference to FIG. 41.

Figure 41:
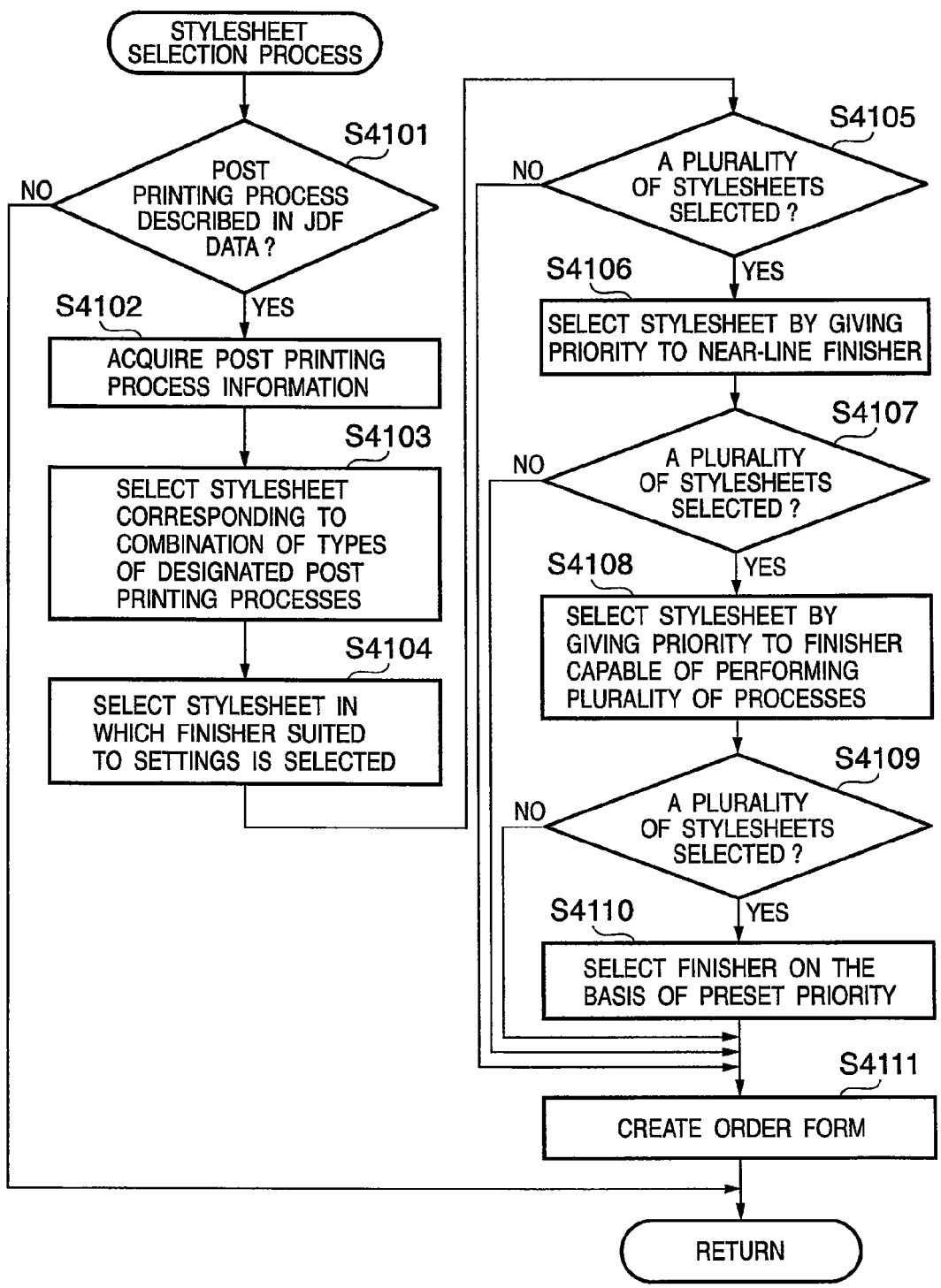
FIG. 41 is a flowchart showing a stylesheet selection process according to the ninth embodiment of the present invention.

FIG. 41 is a flowchart showing the stylesheet selection process according to the ninth embodiment of the present invention.

In step S4101, it is determined from JDF data whether a post printing process is described. If no post printing process is described (NO in step S4101), the process ends; if a post printing process is described (YES in step S4101), the flow advances to step S4102.

In step S4102, post printing process information on the number of post printing processes, their types, their settings, and the like is acquired from the JDF data.

In step S4103, stylesheets corresponding to a combination of the types of designated post printing processes are selected. In this case, stylesheets which comply with a combination of post printing processes designated by settings are selected from information (stylesheet information) on stylesheets which are prepared for respective combinations of various types of post printing processes. When the types of post printing processes designated by settings represent a cutting machine and saddle stitching machine, stylesheets AA and CC are selected.

Note that the stylesheet information is managed in, e.g., the stylesheet selection table in the MFP. In the ninth embodiment, managed stylesheet information corresponds to each combination of various post printing processes. Thus, this stylesheet information manages the types of finishers corresponding to various post printing processes, the types of post printing processes executable by each finisher, and the finisher arrangement position (online finisher/near-line finisher/offline finisher) in the printing system.

In step S4104, a stylesheet suitable for performing a process designated by JDF data is selected from the stylesheets selected in step S4103 on the basis of finisher information held in advance and the settings of the post printing processes that are acquired in step S4102. When post printing processes using a cutting machine and saddle stitching machine are designated by JDF data, stylesheets AA and CC are selected in step S4103 in accordance with stylesheet information of FIG. 42. When saddle stitching set by the JDF data exceeds a thickness of 30 mm, a stylesheet in which a saddle stitching machine designated by the stylesheet meets this saddle stitching setting is selected from stylesheets AA and CC.

In step S4105, it is determined whether a plurality of stylesheets have been selected as a result of the stylesheet selection process so far. If only one stylesheet has been selected (NO in step S4105), the flow advances to step S4111; if a plurality of stylesheets have been selected (YES in step S4105), to step S4106.

In step S4106, a stylesheet in which finishers used include a near-line finisher, or a larger number of near-line finishers are used is selected from the selected stylesheets. That is, a stylesheet is selected by giving priority to a near-line finisher.

In step S4107, it is determined whether a plurality of stylesheets have been selected as a result of the stylesheet selection process so far. If only one stylesheet has been selected (NO in step S4107), the flow advances to step S4111; if a plurality of stylesheets have been selected (YES in step S4107), to step S4108.

In step S4108, a stylesheet in which the smallest number of finishers are used is selected from the selected stylesheets. That is, a stylesheet which designates a finisher capable of performing a plurality of processes in post printing processes designated by the JDF data is selected.

In step S4109, it is determined whether a plurality of stylesheets have been selected as a result of the stylesheet selection process so far. If only one stylesheet has been selected (NO in step S4109), the flow advances to step S4111; if a plurality of stylesheets have been selected (YES in step S4109), to step S4110.

In step S4110, a stylesheet having the highest priority is selected from the remaining stylesheets. This selection is based on priority assigned in advance to each combination of various post printing processes, as represented by the stylesheet information in FIG. 42. Especially in FIG. 42, the storing order is the priority order of stylesheets used in post printing processes. In step S4111, the acquired stylesheet is applied to the JDF data to generate work order form data.

As described above, according to the ninth embodiment, in addition to the effects described in the eighth embodiment, stylesheet information on available stylesheets is managed for each combination of post printing processes. On the basis of the stylesheet information, a stylesheet optimal for a target post printing process can be selected to generate a work order form based on the stylesheet.

Note that the first to ninth embodiments are merely examples, and an embodiment may be implemented by arbitrarily combining these embodiments in accordance with the application purpose. For example, selection of the stylesheet in the eighth or ninth embodiment and generation of the work order form in the first embodiment may be combined.

Various processes described in the embodiments are implemented by the print server and MFP, but are not limited to them. In all the embodiments, all processes except printing may be implemented in the print server, or all processes may be implemented in the MFP. Alternatively, all processes may be implemented in an external apparatus (e.g., personal computer) other than the MFP or print server.

In any case, the MFP, print server, external apparatus, or a combination of them can function as an information processing apparatus which implements various processes described in the above embodiments.

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

This application claims the benefit of Japanese Application No. 2005-118978, filed on Apr. 15, 2005 which is hereby incorporated by reference herein in its entirety.

What is claimed is:

1. An information processing apparatus, comprising
a generation unit adapted to, when a post printing process of a printed product carried from a printing apparatus by an operator is executed by a post processing apparatus for executing the post printing process, generate post processing information indicating process executed by the post processing apparatus;
an extraction unit adapted to extract first page data from printing data;
a PDL data generation unit generates PDL data where the post processing information indicating process executed by the post processing apparatus and an image of the first page data are printed on the same sheet;
a transmitting unit adapted to transmit the PDL data generated by said PDL data generation unit to a printing apparatus.

2. The apparatus according to claim 1, wherein the post processing information indicating process executed by the post processing apparatus is an identification number, contents of post process executed by the post processing apparatus and process parameter.

3. A control method of an information processing apparatus, comprising
a generation step of, when a post printing process of a printed product carried from a printing apparatus by an operator is executed by a post processing apparatus for executing the post printing process, generating post processing information indicating process executed by the post processing apparatus, and;
an extraction step of extracting first page data from printing data;
a PDL data generation step generates PDL data where the post processing information indicating process executed by the post processing apparatus and an image of the first page data are printed on the same sheet;
a transmitting step of transmitting the PDL data generated in said PDL data generation step to a printing apparatus.

4. The method according to claim 3, wherein the post processing information indicating process executed by the post processing apparatus is an identification number, contents of post process executed by the post processing apparatus and process parameter.

5. A non-transitory computer-readable medium on which is stored a computer program to cause a computer to control of an information processing apparatus, causing the computer to execute:
a generation step of, when a post printing process of a printed product carried from a printing apparatus by an operator is executed by a post processing apparatus for executing the post printing process, generating post processing information indicating process executed by the post processing apparatus, and;
an extraction step of extracting first page data from printing data;
a PDL data generation step generates PDL data where the postprocessing information indicating process executed by the post processing apparatus and an image of the first page data are printed on the same sheet;
a transmitting step of transmitting the PDL data generated in said PDL data generation step to a printing apparatus.

6. The computer-readable medium according to claim 5, wherein the post processing information indicating process executed by the post processing apparatus is an identification number, contents of post process executed by the post processing apparatus and process parameter.

* * * * *